US011427196B2

(12) United States Patent
Switkes et al.

(10) Patent No.: US 11,427,196 B2
(45) Date of Patent: Aug. 30, 2022

(54) SYSTEMS AND METHODS FOR MANAGING TRACTOR-TRAILERS

(71) Applicant: Peloton Technology, Inc., Mountain View, CA (US)

(72) Inventors: Joshua P Switkes, Mountain View, CA (US); Shad M Laws, Palo Alto, CA (US); Lorenz Laubinger, San Francisco, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

(21) Appl. No.: 16/384,790

(22) Filed: Apr. 15, 2019

(65) Prior Publication Data

US 2020/0324763 A1    Oct. 15, 2020

(51) Int. Cl.
*B60W 30/12* (2020.01)
*G08G 1/00* (2006.01)
*G08G 1/16* (2006.01)

(52) U.S. Cl.
CPC ............ *B60W 30/12* (2013.01); *G08G 1/161* (2013.01); *G08G 1/166* (2013.01); *G08G 1/22* (2013.01);
(Continued)

(58) Field of Classification Search
CPC .. B60W 30/12; B60W 2556/65; B60W 30/10; B60W 30/16; B60W 2554/80;
(Continued)

(56) References Cited

U.S. PATENT DOCUMENTS

| 3,725,921 A | 4/1973 | Weidman et al. |
| 4,370,718 A | 1/1983 | Chasek |

(Continued)

FOREIGN PATENT DOCUMENTS

| EP | 0982173 A2 | 3/2000 |
| EP | 0991046 A1 | 4/2000 |

(Continued)

OTHER PUBLICATIONS

"Automated Highway System: Milestone 2 Report, Task C2: Downselect System Configurations and Workshop #3" (National Automated Highway System Consortium, Troy, MI, Jun. 1997), 604 pages.

(Continued)

*Primary Examiner* — Faris S Almatrahi
*Assistant Examiner* — Andrew J Cromer
(74) *Attorney, Agent, or Firm* — Redbrick IP, P.C.

(57) ABSTRACT

Systems and methods for causing a vehicle to avoid an adverse action are described. In one aspect, a sensor on first vehicle may determine the existence and location of lane markers or objects, and use that information to cause a second vehicle to avoid exiting its lane or colliding with an object. Data transmitted from a first vehicle to a second vehicle may be used to determine a path for the second vehicle, such that it avoids an adverse action. This data may include information used to determine a pose of the second vehicle, kinematics of the second vehicle, determine dimensions of the second vehicle, and potential adverse actions. This data may be transmitted while the vehicles are platooning.

5 Claims, 12 Drawing Sheets

(52) U.S. Cl.
CPC ... *B60W 2300/145* (2013.01); *B60W 2520/06* (2013.01); *B60W 2520/22* (2013.01); *B60W 2554/80* (2020.02); *B60W 2556/65* (2020.02); *B60W 2710/18* (2013.01)

(58) Field of Classification Search
CPC ....... B60W 2300/145; B60W 2520/06; B60W 2520/22; B60W 2710/18; G08G 1/161; G08G 1/166; G08G 1/22; G05D 1/0295; G01C 22/00; G01S 13/931
See application file for complete search history.

(56) References Cited

U.S. PATENT DOCUMENTS

| | | |
|---|---|---|
| 5,166,881 A | 11/1992 | Akasu |
| 5,295,551 A | 3/1994 | Sukonick |
| 5,331,561 A | 7/1994 | Barrett |
| 5,572,449 A | 11/1996 | Tang et al. |
| 5,633,456 A | 5/1997 | Stander |
| 5,680,122 A | 10/1997 | Mio |
| 5,777,451 A | 7/1998 | Kobayashi et al. |
| 5,781,119 A | 7/1998 | Yamashita et al. |
| 5,815,825 A | 9/1998 | Tachibana et al. |
| 5,880,958 A | 3/1999 | Helms et al. |
| 6,032,097 A | 2/2000 | Iihoshi et al. |
| 6,043,777 A | 3/2000 | Bergman et al. |
| 6,125,321 A | 9/2000 | Tabata et al. |
| 6,128,559 A | 10/2000 | Saitou et al. |
| 6,188,950 B1 | 2/2001 | Tsutsumi et al. |
| 6,265,990 B1 | 7/2001 | Isogai et al. |
| 6,285,929 B1 | 9/2001 | Hashimoto |
| 6,304,211 B1 | 10/2001 | Boman |
| 6,345,603 B1 | 2/2002 | Abboud et al. |
| 6,356,820 B1 | 3/2002 | Hashimoto et al. |
| 6,397,149 B1 | 5/2002 | Hashimoto |
| 6,418,370 B1 | 7/2002 | Isogai et al. |
| 6,437,688 B1 | 8/2002 | Kobayashi |
| 6,484,078 B1 | 11/2002 | Kageyama |
| 6,510,381 B2 | 1/2003 | Grounds et al. |
| 6,604,038 B1 | 8/2003 | Lesesky et al. |
| 6,633,006 B1 | 10/2003 | Wolf et al. |
| 6,640,164 B1 | 10/2003 | Farwell et al. |
| 6,765,495 B1 | 7/2004 | Dunning et al. |
| 6,879,910 B2 | 4/2005 | Shike et al. |
| 6,963,795 B2 | 11/2005 | Haissig et al. |
| 7,110,882 B2 | 9/2006 | Moser et al. |
| 7,286,825 B2 | 10/2007 | Shishido et al. |
| 7,554,435 B2 | 6/2009 | Tengler et al. |
| 7,593,811 B2 | 9/2009 | Schmidt et al. |
| 7,596,811 B2 | 9/2009 | Lloyd et al. |
| 7,729,823 B2 | 6/2010 | Ruoppolo |
| 7,782,227 B2 | 8/2010 | Boss et al. |
| 7,831,345 B2 | 11/2010 | Heino et al. |
| 7,894,982 B2 | 2/2011 | Reeser et al. |
| 8,026,833 B2 | 9/2011 | Villaume et al. |
| 8,073,574 B2 | 12/2011 | Yamamoto et al. |
| 8,116,921 B2 | 2/2012 | Ferrin et al. |
| 8,139,109 B2 | 3/2012 | Schmiedel et al. |
| 8,224,551 B2 | 7/2012 | Grolle et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 | 1/2013 | Mudalige |
| 8,442,735 B2 | 5/2013 | Hrovat et al. |
| 8,538,656 B2 | 9/2013 | Yamashiro |
| 8,554,468 B1 | 10/2013 | Bullock |
| 8,620,517 B2 | 12/2013 | Caveney et al. |
| 8,649,962 B2 | 2/2014 | Davis et al. |
| 8,660,779 B2 | 2/2014 | Shida |
| 8,666,587 B2 | 3/2014 | Anderson |
| 8,676,466 B2 | 3/2014 | Mudalige |
| 8,682,511 B2 | 3/2014 | Andreasson |
| 8,688,349 B2 | 4/2014 | Grolle et al. |
| 8,738,238 B2 | 5/2014 | Rekow |
| 8,744,666 B2 | 6/2014 | Switkes et al. |
| 8,775,060 B2 | 7/2014 | Solyom et al. |
| 8,798,887 B2 | 8/2014 | Nickolaou et al. |
| 8,798,907 B2 | 8/2014 | Shida |
| 8,914,225 B2 | 12/2014 | Caskey et al. |
| 8,922,391 B2 | 12/2014 | Rubin et al. |
| 8,947,531 B2 | 2/2015 | Fischer et al. |
| 8,948,995 B2 | 2/2015 | Pandita et al. |
| 8,954,272 B2 | 2/2015 | Adam et al. |
| 9,037,389 B2 | 5/2015 | You |
| 9,079,587 B1 | 7/2015 | Rupp et al. |
| 9,141,112 B1 | 9/2015 | Loo et al. |
| 9,145,137 B2 | 9/2015 | Doi et al. |
| 9,174,672 B2 | 11/2015 | Zeng et al. |
| 9,224,300 B2 | 12/2015 | Lee et al. |
| 9,304,515 B2 | 4/2016 | Cudak et al. |
| 9,355,423 B1 | 5/2016 | Slusar |
| 9,367,065 B2 | 6/2016 | Dolgov et al. |
| 9,373,149 B2 | 6/2016 | Abhyanker |
| 9,384,666 B1 | 7/2016 | Harvey |
| 9,396,661 B2 | 7/2016 | Okamoto |
| 9,423,794 B2 | 8/2016 | Lind et al. |
| 9,449,258 B1 | 9/2016 | Palacio et al. |
| 9,494,944 B2 | 11/2016 | Alam et al. |
| 9,582,006 B2 | 2/2017 | Switkes et al. |
| 9,598,078 B2 | 3/2017 | Moran et al. |
| 9,613,466 B1 | 4/2017 | Bullock |
| 9,616,743 B1 | 4/2017 | Mays et al. |
| 9,618,347 B2 | 4/2017 | Chambers et al. |
| 9,632,507 B1 | 4/2017 | Kom |
| 9,645,579 B2 | 5/2017 | Switkes et al. |
| 9,665,102 B2 | 5/2017 | Switkes et al. |
| 9,721,474 B2 | 8/2017 | Eskilson |
| 9,751,532 B2 | 9/2017 | Gordon et al. |
| 9,771,070 B2 | 9/2017 | Zagorski et al. |
| 9,776,638 B1 | 10/2017 | Green |
| 9,799,224 B2 | 10/2017 | Okamoto |
| 9,823,166 B2 | 11/2017 | Dudar et al. |
| 9,841,762 B2 | 12/2017 | Moran et al. |
| 9,869,560 B2 | 1/2018 | Gordon et al. |
| 9,878,657 B2 | 1/2018 | Wunsche, III |
| 9,884,631 B2 | 2/2018 | James et al. |
| 9,927,816 B2 | 3/2018 | Li et al. |
| 9,928,746 B1 | 3/2018 | MacNeille et al. |
| 9,940,840 B1 | 4/2018 | Schubert et al. |
| 9,956,964 B2 | 5/2018 | Desnoyer et al. |
| 9,964,948 B2 | 5/2018 | Ullrich et al. |
| 10,013,877 B2 | 7/2018 | Lu et al. |
| 10,017,039 B1 | 7/2018 | Colavincenzo |
| 10,017,179 B2 | 7/2018 | Alden et al. |
| 10,027,024 B2 | 7/2018 | Powell |
| 10,031,522 B2 | 7/2018 | Moran et al. |
| 10,042,365 B2 | 8/2018 | Switkes et al. |
| 10,074,894 B1 | 9/2018 | Birnbaum et al. |
| 10,254,764 B2 | 4/2019 | Laubinger et al. |
| 10,474,166 B2 | 11/2019 | Switkes et al. |
| 10,482,767 B2 | 11/2019 | Miller et al. |
| 10,520,581 B2 | 12/2019 | Schuh et al. |
| 10,520,952 B1 | 12/2019 | Luckevich et al. |
| 10,593,211 B2 | 3/2020 | Kim |
| 10,618,503 B2 | 4/2020 | Lim |
| 10,625,742 B2 | 4/2020 | D'sa et al. |
| 2001/0001138 A1 | 5/2001 | Zhu et al. |
| 2002/0077748 A1 | 6/2002 | Nakano |
| 2002/0135507 A1 | 9/2002 | Winner et al. |
| 2002/0152015 A1 | 10/2002 | Seto |
| 2002/0198632 A1 | 12/2002 | Breed et al. |
| 2004/0078133 A1 | 4/2004 | Miller et al. |
| 2004/0140143 A1 | 7/2004 | Saeki et al. |
| 2004/0245853 A1 | 12/2004 | Odagawa et al. |
| 2006/0074557 A1 | 4/2006 | Mulligan et al. |
| 2006/0095195 A1 | 5/2006 | Nishimura et al. |
| 2006/0106534 A1 | 5/2006 | Kawamata et al. |
| 2006/0161341 A1 | 7/2006 | Haegebarth et al. |
| 2006/0195250 A1 | 8/2006 | Kawaguchi |
| 2006/0229804 A1 | 10/2006 | Schmidt et al. |
| 2007/0027614 A1 | 2/2007 | Reeser et al. |
| 2007/0032245 A1 | 2/2007 | Alapuranen |
| 2007/0043502 A1 | 2/2007 | Mudalige et al. |
| 2007/0060045 A1 | 3/2007 | Prautzsch |

(56) References Cited

U.S. PATENT DOCUMENTS

| | | |
|---|---|---|
| 2007/0213915 A1 | 9/2007 | Tange et al. |
| 2007/0233337 A1 | 10/2007 | Plishner |
| 2007/0276597 A1 | 11/2007 | Kato et al. |
| 2008/0009985 A1 | 1/2008 | Plishner |
| 2008/0059007 A1 | 3/2008 | Whittaker et al. |
| 2008/0249667 A1 | 3/2008 | Horvitz et al. |
| 2008/0119965 A1 | 5/2008 | McCrary |
| 2008/0122652 A1 | 5/2008 | Tengler et al. |
| 2008/0255722 A1 | 10/2008 | McClellan et al. |
| 2008/0258890 A1 | 10/2008 | Follmer et al. |
| 2009/0012666 A1 | 1/2009 | Simpson et al. |
| 2009/0051510 A1 | 2/2009 | Follmer et al. |
| 2009/0062974 A1 | 3/2009 | Tamamoto et al. |
| 2009/0079839 A1 | 3/2009 | Fischer et al. |
| 2009/0118889 A1 | 5/2009 | Heino et al. |
| 2009/0157461 A1 | 6/2009 | Wright et al. |
| 2009/0164082 A1 | 6/2009 | Kobayashi et al. |
| 2009/0222186 A1 | 9/2009 | Jensen |
| 2009/0287412 A1 | 11/2009 | Menzel et al. |
| 2009/0326799 A1 | 12/2009 | Crook |
| 2010/0044998 A1 | 2/2010 | Franchineau |
| 2010/0049374 A1 | 2/2010 | Ferrin et al. |
| 2010/0094509 A1 | 4/2010 | Lüke et al. |
| 2010/0191449 A1 | 7/2010 | Iwamoto |
| 2010/0194638 A1 | 8/2010 | Rivard |
| 2010/0250088 A1 | 9/2010 | Grolle et al. |
| 2010/0256835 A1 | 10/2010 | Mudalige |
| 2010/0256836 A1 | 10/2010 | Mudalige |
| 2010/0256852 A1 | 10/2010 | Mudalige |
| 2010/0332101 A1 | 12/2010 | Braunberger et al. |
| 2011/0010022 A1 | 1/2011 | Beavin |
| 2011/0083011 A1 | 4/2011 | DiCrescenzo |
| 2011/0093177 A1 | 4/2011 | Horn |
| 2011/0112730 A1 | 5/2011 | Rekow |
| 2011/0118967 A1 | 5/2011 | Tsuda |
| 2011/0184596 A1 | 7/2011 | Andreasson |
| 2011/0184605 A1 | 7/2011 | Neff |
| 2011/0202730 A1 | 8/2011 | Sonoda et al. |
| 2011/0222730 A1 | 9/2011 | Steinberg et al. |
| 2011/0270514 A1 | 11/2011 | Shida |
| 2011/0270520 A1 | 11/2011 | Kronenberg |
| 2011/0301779 A1 | 12/2011 | Shida |
| 2012/0010762 A1 | 1/2012 | Asano |
| 2012/0059573 A1 | 3/2012 | Nortrup |
| 2012/0072051 A1 | 3/2012 | Koon et al. |
| 2012/0109421 A1 | 5/2012 | Scarola |
| 2012/0123660 A1 | 5/2012 | Kagawa et al. |
| 2012/0239268 A1 | 9/2012 | Chen et al. |
| 2012/0252415 A1 | 10/2012 | Menzel et al. |
| 2012/0259516 A1 | 10/2012 | Grolle et al. |
| 2012/0259538 A1 | 10/2012 | Oexmann |
| 2012/0323474 A1 | 12/2012 | Breed et al. |
| 2013/0015984 A1 | 1/2013 | Yamashiro |
| 2013/0018766 A1 | 1/2013 | Christman |
| 2013/0024084 A1 | 1/2013 | Yamashiro |
| 2013/0030606 A1 | 1/2013 | Mudalige et al. |
| 2013/0041567 A1 | 2/2013 | Yamashiro |
| 2013/0041576 A1 | 2/2013 | Switkes et al. |
| 2013/0066511 A1* | 3/2013 | Switkes ............... G01S 13/931 701/28 |
| 2013/0079953 A1 | 3/2013 | Kumabe |
| 2013/0080040 A1 | 3/2013 | Kumabe |
| 2013/0080041 A1 | 3/2013 | Kumabe |
| 2013/0090803 A1 | 4/2013 | Stählin et al. |
| 2013/0116861 A1 | 5/2013 | Nemoto |
| 2013/0124064 A1 | 5/2013 | Nemoto |
| 2013/0144465 A1 | 6/2013 | Shida |
| 2013/0144502 A1 | 6/2013 | Shida |
| 2013/0151058 A1 | 6/2013 | Zagorski et al. |
| 2013/0158852 A1 | 6/2013 | Stahlin et al. |
| 2013/0165146 A1 | 6/2013 | Stählins et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0317676 A1 | 11/2013 | Cooper et al. |
| 2013/0325306 A1 | 12/2013 | Caveney et al. |
| 2014/0005906 A1 | 1/2014 | Pandita et al. |
| 2014/0005941 A1 | 1/2014 | Paek et al. |
| 2014/0019031 A1 | 1/2014 | Solyom et al. |
| 2014/0058563 A1 | 2/2014 | Lacaze et al. |
| 2014/0067220 A1 | 3/2014 | Seiler |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0142799 A1 | 5/2014 | Ferguson et al. |
| 2014/0145838 A1 | 5/2014 | Tuukkanen |
| 2014/0148994 A1 | 5/2014 | Ando |
| 2014/0172265 A1 | 6/2014 | Funabashi |
| 2014/0197967 A1 | 7/2014 | Modica et al. |
| 2014/0210645 A1 | 7/2014 | Sharma |
| 2014/0236449 A1 | 8/2014 | Horn |
| 2014/0244144 A1 | 8/2014 | You |
| 2014/0249693 A1 | 9/2014 | Stark et al. |
| 2014/0297063 A1 | 10/2014 | Shida |
| 2014/0303870 A1 | 10/2014 | Switkes et al. |
| 2014/0306799 A1 | 10/2014 | Ricci |
| 2014/0306826 A1 | 10/2014 | Ricci |
| 2014/0309836 A1 | 10/2014 | Ollis |
| 2014/0316671 A1 | 10/2014 | Okamoto |
| 2014/0316865 A1 | 10/2014 | Okamoto |
| 2014/0350756 A1 | 11/2014 | Schoonmaker et al. |
| 2014/0350793 A1 | 11/2014 | Schräbler et al. |
| 2015/0045993 A1 | 2/2015 | Cooper et al. |
| 2015/0061864 A1 | 3/2015 | Buck, Jr. et al. |
| 2015/0100192 A1 | 4/2015 | Lee et al. |
| 2015/0120137 A1 | 4/2015 | Zeng et al. |
| 2015/0151737 A1 | 6/2015 | Birch et al. |
| 2015/0153733 A1 | 6/2015 | Ohmura et al. |
| 2015/0153738 A1 | 6/2015 | Al-Buraiki et al. |
| 2015/0154871 A1 | 6/2015 | Rothoff et al. |
| 2015/0160014 A1 | 6/2015 | Hewitt et al. |
| 2015/0161894 A1 | 6/2015 | Duncan et al. |
| 2015/0178998 A1 | 6/2015 | Attard et al. |
| 2015/0251676 A1 | 9/2015 | Golden et al. |
| 2015/0262481 A1 | 9/2015 | Selin |
| 2015/0279122 A1 | 10/2015 | Lorenzen |
| 2015/0296019 A1 | 10/2015 | Onishi et al. |
| 2015/0314790 A1 | 11/2015 | Deragarden et al. |
| 2015/0353085 A1* | 12/2015 | Lee ...................... B60W 30/12 701/533 |
| 2015/0356635 A1 | 12/2015 | Thurston |
| 2015/0378722 A1 | 12/2015 | Zuniga-Hernandez |
| 2016/0009284 A1 | 1/2016 | Tokimasa et al. |
| 2016/0019782 A1 | 1/2016 | Alam et al. |
| 2016/0026187 A1 | 1/2016 | Alam et al. |
| 2016/0039412 A1 | 2/2016 | Stählin |
| 2016/0054735 A1 | 2/2016 | Switkes et al. |
| 2016/0102981 A1 | 4/2016 | Hubbard et al. |
| 2016/0187138 A1 | 6/2016 | Chakraborty et al. |
| 2016/0187141 A1 | 6/2016 | Kulkarni et al. |
| 2016/0194014 A1 | 7/2016 | Rajendran |
| 2016/0198303 A1 | 7/2016 | Grotendorst et al. |
| 2016/0267796 A1 | 9/2016 | Hiroma et al. |
| 2016/0272207 A1 | 9/2016 | Dolgov et al. |
| 2016/0273930 A1 | 9/2016 | Wada et al. |
| 2016/0297447 A1 | 10/2016 | Suzuki |
| 2016/0300186 A1 | 10/2016 | Scharaswak et al. |
| 2016/0359741 A1 | 12/2016 | Cooper et al. |
| 2016/0362048 A1 | 12/2016 | Matthews et al. |
| 2017/0011633 A1 | 1/2017 | Boegel |
| 2017/0069203 A1 | 3/2017 | Sharma |
| 2017/0083844 A1 | 3/2017 | Baker et al. |
| 2017/0115666 A1 | 4/2017 | Kolhouse et al. |
| 2017/0122841 A1 | 5/2017 | Dudar et al. |
| 2017/0132299 A1 | 5/2017 | Fox et al. |
| 2017/0168503 A1 | 6/2017 | Amla et al. |
| 2017/0174223 A1 | 6/2017 | Munasinghe et al. |
| 2017/0178536 A1 | 6/2017 | Manci et al. |
| 2017/0186327 A1 | 6/2017 | Uysal et al. |
| 2017/0197544 A1 | 7/2017 | Wang et al. |
| 2017/0212511 A1 | 7/2017 | Ferreira et al. |
| 2017/0227972 A1 | 8/2017 | Sabau |
| 2017/0235316 A1 | 8/2017 | Shattil |
| 2017/0238321 A1 | 8/2017 | Sartori et al. |

(56) References Cited

U.S. PATENT DOCUMENTS

| | | |
|---|---|---|
| 2017/0242095 A1* | 8/2017 | Schuh .................. G05D 1/0293 |
| 2017/0242443 A1 | 8/2017 | Schuh et al. |
| 2017/0261997 A1 | 9/2017 | Switkes et al. |
| 2017/0289864 A1 | 10/2017 | Narasimha et al. |
| 2017/0293296 A1 | 10/2017 | Stenneth et al. |
| 2017/0308097 A1 | 10/2017 | Switkes et al. |
| 2017/0309187 A1 | 10/2017 | Lin |
| 2017/0323244 A1 | 11/2017 | Rani et al. |
| 2017/0329348 A1 | 11/2017 | Li et al. |
| 2017/0344023 A1 | 11/2017 | Laubinger et al. |
| 2017/0349058 A1 | 12/2017 | Bernier et al. |
| 2017/0349176 A1 | 12/2017 | Alden et al. |
| 2017/0361762 A1 | 12/2017 | Wunsche et al. |
| 2017/0363430 A1 | 12/2017 | Al-Dahle et al. |
| 2018/0006365 A1 | 1/2018 | Powell |
| 2018/0018605 A1 | 1/2018 | Light-Holets et al. |
| 2018/0032072 A1 | 2/2018 | Hoye |
| 2018/0047293 A1 | 2/2018 | Dudar |
| 2018/0050697 A1 | 2/2018 | Kuszmaul et al. |
| 2018/0074514 A1 | 3/2018 | Switkes et al. |
| 2018/0082590 A1 | 3/2018 | MacNeille et al. |
| 2018/0082591 A1 | 3/2018 | Pandy |
| 2018/0084511 A1 | 3/2018 | Wu et al. |
| 2018/0095177 A1 | 4/2018 | Peake et al. |
| 2018/0111611 A1 | 4/2018 | MacNeille et al. |
| 2018/0120861 A1 | 5/2018 | Saxena et al. |
| 2018/0137763 A1 | 5/2018 | Deragården et al. |
| 2018/0143650 A1 | 5/2018 | Klaus et al. |
| 2018/0143651 A1 | 5/2018 | Klaus et al. |
| 2018/0144640 A1 | 5/2018 | Price et al. |
| 2018/0186381 A1 | 7/2018 | Erlien et al. |
| 2018/0188725 A1 | 7/2018 | Cremona et al. |
| 2018/0188744 A1 | 7/2018 | Switkes et al. |
| 2018/0188745 A1 | 7/2018 | Pilkington |
| 2018/0188746 A1 | 7/2018 | Lesher et al. |
| 2018/0190119 A1 | 7/2018 | Miller et al. |
| 2018/0190128 A1 | 7/2018 | Saigusa |
| 2018/0210457 A1 | 7/2018 | Smartt et al. |
| 2018/0210461 A1 | 7/2018 | Cremona et al. |
| 2018/0210462 A1 | 7/2018 | Switkes et al. |
| 2018/0210463 A1 | 7/2018 | Switkes et al. |
| 2018/0210464 A1 | 7/2018 | Switkes et al. |
| 2018/0211544 A1 | 7/2018 | Smartt et al. |
| 2018/0211545 A1 | 7/2018 | Smartt et al. |
| 2018/0211546 A1 | 7/2018 | Smartt et al. |
| 2018/0217610 A1 | 8/2018 | Schuh et al. |
| 2018/0284293 A1 | 10/2018 | Pan |
| 2019/0012919 A1 | 1/2019 | Brandriff et al. |
| 2019/0180629 A1 | 6/2019 | Kim |
| 2019/0220037 A1 | 7/2019 | Vladimerou et al. |
| 2019/0279513 A1 | 9/2019 | Schuh et al. |
| 2020/0057453 A1 | 2/2020 | Laws et al. |
| 2020/0092685 A1 | 3/2020 | Fehrenbach et al. |
| 2020/0094821 A1 | 3/2020 | Kim |

FOREIGN PATENT DOCUMENTS

| | | |
|---|---|---|
| EP | 0991046 B1 | 3/2005 |
| EP | 1975901 B1 | 3/2009 |
| EP | 2390744 A1 | 11/2011 |
| EP | 3052355 A1 | 8/2016 |
| EP | 3316064 A1 | 5/2018 |
| GB | 2540039 A | 1/2017 |
| GB | 2551248 A | 12/2017 |
| GB | 2557001 A | 6/2018 |
| GB | 2557434 A | 6/2018 |
| JP | 05170008 A | 7/1993 |
| JP | 1993170008 A | 9/1993 |
| JP | 2995970 B2 | 12/1999 |
| JP | 2010030525 A | 2/2010 |
| JP | 5141849 B2 | 2/2013 |
| JP | 2014056483 A | 3/2014 |
| JP | 2014145598 A | 8/2014 |
| JP | 2017215681 A | 12/2017 |
| WO | 2004077378 A1 | 9/2004 |
| WO | 2009024563 A1 | 2/2009 |
| WO | 2009043643 A1 | 4/2009 |
| WO | 2010098554 A2 | 9/2010 |
| WO | 2011125193 A1 | 10/2011 |
| WO | 2011151274 A1 | 12/2011 |
| WO | 2013006826 A2 | 1/2013 |
| WO | 2013006826 A3 | 3/2013 |
| WO | 2013147682 A1 | 10/2013 |
| WO | 2013165297 A1 | 11/2013 |
| WO | 2013187835 A1 | 12/2013 |
| WO | 2014062118 A1 | 4/2014 |
| WO | 2014092628 A1 | 6/2014 |
| WO | 2014133425 A1 | 9/2014 |
| WO | 2014137270 A1 | 9/2014 |
| WO | 2014137271 A1 | 9/2014 |
| WO | 2014145918 A9 | 12/2014 |
| WO | 2015047174 A1 | 4/2015 |
| WO | 2015047175 A1 | 4/2015 |
| WO | 2015047176 A1 | 4/2015 |
| WO | 2015047177 A1 | 4/2015 |
| WO | 2015047178 A1 | 4/2015 |
| WO | 2015047179 A1 | 4/2015 |
| WO | 2015047181 A1 | 4/2015 |
| WO | 2015047182 A1 | 4/2015 |
| WO | 2015156731 A1 | 10/2015 |
| WO | 2016065055 A1 | 4/2016 |
| WO | 2016087901 A1 | 6/2016 |
| WO | 2016134610 A1 | 9/2016 |
| WO | 2016134770 A1 | 9/2016 |
| WO | 2016135207 A1 | 9/2016 |
| WO | 2016182489 A1 | 11/2016 |
| WO | 2016201435 A1 | 12/2016 |
| WO | 2017035516 A1 | 3/2017 |
| WO | 2017048165 A1 | 3/2017 |
| WO | WO-2017035516 A1 * | 3/2017 ............. G08G 1/161 |
| WO | 2017070714 A9 | 6/2017 |
| WO | 2017148113 A1 | 9/2017 |
| WO | 2017164792 A1 | 9/2017 |
| WO | 2017179193 A1 | 10/2017 |
| WO | 2017184062 A1 | 10/2017 |
| WO | 2017184063 A1 | 10/2017 |
| WO | 2017196165 A1 | 11/2017 |
| WO | 2017200433 A1 | 11/2017 |
| WO | 2017204712 A1 | 11/2017 |
| WO | 2017209124 A1 | 12/2017 |
| WO | 2017209666 A1 | 12/2017 |
| WO | 2017210200 A1 | 12/2017 |
| WO | 2018000386 A1 | 1/2018 |
| WO | 2018035145 A1 | 2/2018 |
| WO | 2018038964 A1 | 3/2018 |
| WO | 2018039114 A1 | 3/2018 |
| WO | 2018039134 A1 | 3/2018 |
| WO | 2018043519 A1 | 3/2018 |
| WO | 2018043520 A1 | 3/2018 |
| WO | 2018043753 A1 | 3/2018 |
| WO | 2018054520 A1 | 3/2018 |
| WO | 2018085107 A1 | 5/2018 |
| WO | 2018097465 A1 | 5/2018 |
| WO | 2018106774 A1 | 6/2018 |
| WO | 2018111177 A1 | 6/2018 |
| WO | 2018135630 A1 | 7/2018 |
| WO | 2018137754 A1 | 8/2018 |

OTHER PUBLICATIONS

"Surface Vehicle Recommended Practice, J1939-71, Vehicle Application Layer" (SAE International, Warrendale, PA, Mar. 2011), 1201 pages.

Al Alam, Assad et al. "An Experimental Study on the Fuel Reduction Potential of Heavy Duty Vehicle Platooning", 2010 13th International IEEE Annual Conference on Intelligent Transportation Systems, Sep. 2010, pp. 306-311.

Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.

(56) References Cited

OTHER PUBLICATIONS

Alvarez, Luis & Horowitz, Roberto, "Safe Platooning in Automated Highway Systems Part I: Safety Regions Design", Vehicle System Dynamics, vol. 32, Jul. 1999, pp. 23-55.
Aoki, Keiji, "Research and development of fully automated vehicles", International Conference "Global/Local Innovations for Next Generation Automobiles" Part 1, paper OS5-1, Nov. 2013, 3 pages.
Bae, Hong S. et al., "Road Grade and Vehicle Parameter Estimation for Longitudinal Control Using GPS", 2001 IEEE Intellegent Transportaion Systems Conference Proceedings, Aug. 2001, pp. 166-171.
Bergenheim, Carl et al., "Overview of Platooning Systems", 19th ITS World Congress, Vienna, Austria, Oct. 22-26, 2012, 7 pages.
Bergenheim, Carl et al., "Vehicle-to-Vehicle Communication for a Platooning System", Procedia—Social and Behavioral Sciences, vol. 48, Jun. 2012, pp. 1222-1233.
Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages;Retrieved Aug. 23, 2018 at http://atri-online.org/wp-content/uploads/2015/05/DATPPhase1FinalReport.pdf.
Bishop, Richard et al., "White Paper: Automated Driving and Platooning Issues and Opportunities", ATA Technology and Maintenance Council Future Truck Program, Automated Driving and Platooning Task Force Report (Auburn Univ., Auburn, AL, Sep. 2015), 48 pages;Retrieved Nov. 17, 2017 from http://eng.aubum.edu/~dmbevly/FHWA_AU_TRUCK_EAR/FHWA_AuburnDATP_Phase1FinalReport.
Brizzolara, Davide & Toth, Andrea, "The Emergence of Truck Platooning", Baltic Transport Journal, Mar. 2016, pp. 58-59.
Browand, Fred et al. "Fuel Saving Achieved in the Field Test of Two Tandem Trucks", California PATH Research Report UCB-ITS-PRR-2004-20 (U.C. Berkeley, Berkeley, CA, Jun. 2004), 29 pages.
Desjardins, Charles et al., "Cooperative Adaptive Cruise Control: A Reinforcement Learning Approach", IEEE Transactions on Intelligent Transportation Systems, vol. 12, No. 4, Dec. 2011, pp. 1248-1260.
Erlien, Stephen M., "Shared Vehicle Control Using Safe Driving Envelopes for Obstacle Avoidance", Ph.D Dissertation, Dept. of Mechanical Engineering (Stanford University, Stanford, CA, Mar. 2015), 182 pages.
Friedrichs, Andreas et al., "A Generic Software Architecture for a Driver Information System to Organize and Operate Truck Platoons", International Conference on Heavy Vehicles, Paris, France, vol. 10, May 2008, pp. 250-259.
Geiger, Andreas et al., "Team AnnieWay's Entry to the 2011 Grand Cooperative Driving Challenge", IEEE Transactions on Intelligent Transportation Systems, vol. 13, No. 3, Sep. 2012, pp. 1008-1017.
Gerdes, J. Christian & Hedrick, J. Karl, "Brake System Requirements for Platooning on an Automated Highway", Proceedings of the American Control Conference, Seattle, WA, Jun. 1995, pp. 165-169.
Gerdes, J. Christian & Hedrick, J. Karl, "Vehicle Speed and Spacing Control via Coordinated Throttle and Brake Actuation", Control Eng. Practice, vol. 5, No. 11, Sep. 1997, pp. 1607-1614.
Hallé, Simon, "Automated Highway Systems: Platoons of Vehicles Viewed as a Multiagent System", M.Sc. Dissertation, Facultédes Sciences et de Gënie (Univ. Laval, Quebec, Canada, Jun. 2005), 194 pages.
Hellström, Magnus, "Engine Speed Based Estimation of the indicated Engine Torque", Master's Thesis, Dept. of Electrical Engineering, Reg # LiTH-ISY-EX-3569-2005 (Linköpings Universitet, Linköping, Sweden, Feb. 2005), 59 pages.
Holm, Erik Jonsson, "Vehicle Mass and Road Grade Estimation Using Kalman Filter", Master's Thesis, Dept. of Electrical Engineering, LiTH-ISY-EX—11/4491—SE (Linköpings Universitet, Linköping, Sweden, Aug. 2011), 50 pages.
Jacobson, Jan et al. "Functional Safety in Systems of Road Vehicles", SP Report 2010:07 (SP Technical Research Institute of Sweden, Borås, Sweden, Jul. 2010), 50 pages.
Kidambi, Narayanan et al. "Methods in Vehicle Mass and Road Grade Estimation", SAE Int. J. Passeng. Cars—Mech. Syst, vol. 7 No. 3, Apr. 2014, 2014-01-0111, 11 pages.
Korean Intellectual Property Office, ISA, "International Search Report and Written Opinion" in PCT Application No. PCT/US2012/045830, Jan. 7, 2013, 9 pages.
Kozan, Recep et al., "An Experimental Approach for Engine Mapping", Modem Applied Science, vol. 3, No. 3, Mar. 2009, pp. 3-9.
Kunze, Ralph et al. "Efficient Organization of Truck Platoons by Means of Data Mining", ICINCO 2010, Proceedings of the 7th International Conference on Informatics in Control, Automation and Robotics, vol. 1, Funchal, Madeira, Portugal, Jan. 2010, pp. 104-113.
Kunze, Ralph et al., "Organization and Operation of Electronically Coupled Truck Platoons on German Motorways", International Conference on Intelligent Robotics and Applications, Conference Proceedings ICIRA2009, Singapore, Dec. 2009, pp. 135-146.
Larson, Jeffrey et al., "Coordinated Route Optimization for Heavy-duty Vehicle Platoons", Proceedings of the 16th International IEEE Annual Conference on Intelligent Transportation Systems (ITSC 2013), The Hague, The Netherlands, Oct. 2013, pp. 1196-1202.
Li, Shengbo Eben & Peng, Huei, "Strategies to Minimize Fuel Consumption of Passenger Cars During Car—Following Scenarios", 2011 American Control Conference, San Francisco, CA, Jun. 2011, pp. 2107-2112.
Lu, Xiao-Yun & Shladover, Steven E., "Automated Truck Platoon Control and Field Test", in Road Vehicle Automation, Lecture Notes in Mobility, G. Meyer & S. Beiker (eds) (Springer Intl. Publishing, Switzeriand, Jul. 2014), pp. 247-261.
Meisen, Philipp et al. "A Data-Mining Technique for the Planning and Organization of Truck Platoons", International Conference on Heavy Vehicles, Paris, France, vol. 10, May 2008, pp. 270-279.
Michaelian, Mark & Browand, Fred, "Field Experiments Demonstrate Fuel Savings for Close-Following", California PATH Research Report UCB-ITS-PRR-2000-14, (U.C. Berkeley, Berkeley, CA, Sep. 2000), 28 pages.
Micheau, Philippe & Oddo, Rëmy, "Revolution Speed Limiter for Engine Subjected to Large Load Variation",IFAC Advances in Automotive Control, Salerno, Italy, Apr. 2004, pp. 221-226.
Nowakowski, Christopher et al. "Cooperative Adaptive Cruise Control: Testing Drivers' Choices of Following Distances", California Path Research Report UCB-ITS-PRR-2011-01 (U.C. Berkeley, Jan. 2011), 171 pages.
Nowakowski, Christopher et al., "Cooperative Adaptive Cruise Control (CACC) for Truck Platooning: Operational Concept Alternatives", Research Report under Cooperative Agreement No. DTFH61-13-H-00012 Task 1.2, California PATH Program, (U.C. Berkeley, Berkeley, CA, Mar. 2015), 50 pages; Retrieved Aug. 25, 2017 from http://escholarship.org/uc/item/7jf9n5wm.
Nowakowski, Christopher et al., "Heavy vehicle automation: Human factors lessons learned", Procedia Manufacturing vol. 3, Jul. 2015, pp. 2945-2952.
Packard, Andrew et al., "Section 5, Simple Cruise Control", Class notes, ME 132:Dynamic Systems and Feedback, Dept. of Mechanical Engineering (U.C. Berkeley, Spring 2005), pp. 24-52.
Paulsson, E. & Asman, L., "Vehicle Mass and Road Grade Estimation using Recursive Least Squares", M.Sc. Thesis, Department of Automatic Control, ISRN LUTFD2/TFRT-6009-SE (Lund University, Lund, Sweden, Jun. 2016), 51 pages.
Porche, Isaac et al., "Real Time Task Manager for Communications and Control in Multicar Platoons", in Proceedings of the Intelligent Vehicles'92 Symposium, Detroit, MI, Jun. 29-Jul. 1, 1992, pp. 409-414.
Ramakers, Richard et al., "Electronically coupled truck platoons on German highways", Proceedings of the 2009 IEEE International Conference on Systems, Man, and Cybernetics, San Antonio, TX, Oct. 2009, pp. 2409-2414.

(56) References Cited

OTHER PUBLICATIONS

Roeth, Michael, "CR England Peloton Technology Platooning Test Nov. 2013", (North American Council on Freight Efficiency (NACFE.org), Fort Wayne, IN, Dec. 2013);Retrieved Aug. 23, 2018 at https://nacfe.org/wp-content/uploads/2018/02/Peloton-NACFE-Fuel-Test-Report-120213.pdf.

Sheikholeslam, Shahab & Desoer, Charles A. "Longitudinal Control of a Platoon of Vehicles; III: Nonlinear Model", UCB Path Report UCB-ITS-PRR-90-1 (U.C. Berkeley, Berkeley, CA, Apr. 1990), 25 pages.

Sheikholeslam, Shahab & Desoer, Charles A., "A System Level Study of the Longitudinal Control of a Platoon of Vehicles", Transactions of the ASME, vol. 114, Jun. 1992, pp. 286-292.

Sheikholeslam, Shahab & Desoer, Charles A., "Longitudinal Control of a Platoon of Vehicles", Proceedings of the American Control Conference, San Diego, CA, May 23-25, 1990, pp. 291-296.

Shladover, Steven E. et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.

Shladover, Steven E. et al., "Cooperative Adaptive Cruise Control: Definitions and Operating Concepts", Transportation Research Record: Journal of the Transportation Research Board, vol. 2489, Nov. 2015, pp. 145-152.

Shladover, Steven E. et al., "Demonstration of Automated Heavy-Duty Vehicles", California PATH Research Report UCB-ITS-PRR-2005-23 (U.C. Berkeley, Berkeley, CA, Jun. 2005), 459 pages.

Shladover, Steven E., "Development and Evaluation of Selected Mobility Applications for VII (a.k.a. IntelliDrive)", California PATH PowerPoint Presentation (U.C. Berkeley, Berkeley, CA, Jul. 2009), 17 pages; Retrieved Jul. 21, 2017 from http://slideplayer.com/slide/6981587/.

Sugimachi, Toshiyuki et al. "Development of Autonomous Platooning System for Heavy-duty Trucks", Proceedings of the 7th IFAC Symposium on Advances in Automotive Control, Tokyo, Japan, IFAC Proceedings vol. 16, Issue 21, Sep. 2013, pp. 52-57.

Tsugawa, Sadayuki et al., "A Review of Truck Platooning Projects for Energy Savings", IEEE Transactions on Intelligent Vehicles, vol. 1 No. 1, Mar. 2016, pp. 68-77.

Tsugawa, Sadayuki et al., "An Automated Truck Platoon for Energy Saving", 2011 IEEE/RSJ International Conference on Intelligent Robots and Systems, San Francisco, CA, Sep. 2011, pp. 4109-4114.

Tsugawa, Sadayuki et al., "An Overview on an Automated Truck Platoon within the Energy ITS Project", Proceedings of the 7th IFAC Symposium on Advances in Automotive Control, Tokyo, Japan, IFAC Proceedings vol. 46, Issue 21, Sep. 2013, pp. 41-46.

U.S. Appl. No. 61/167,121.

Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.

Zabat, Michael et al., "The Aerodynamic Performance of Platoons: Final Report", California PATH Research Report UCB-ITS-PRR-95-35 (U.C. Berkeley, Berkeley, CA, Oct. 1995), 172 pages.

Zhao, Siyang et al., "Vehicle to Vehicle Communication and Platooning for EV with Wireless Sensor Network", SICE Annual Conference 2015, Hangzhou, China, Jul. 2015, pp. 1435-1440.

\* cited by examiner

SYSTEMS AND METHODS FOR MANAGING TRACTOR-TRAILERS

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the leading vehicle (also referred to herein as a front vehicle). In general, these cruise control systems provide minimal added safety, and do not have full control of the vehicle (in terms of being able to fully brake or accelerate).

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining an optimal headway as an automated system is. In fact, a driver trying to maintain a constant headway often causes rapid and large changes in command (accelerator pedal position for example), resulting in a loss of efficiency.

Thus, it would be desirable to have reliable and economical semi-automated vehicular convoying/platooning systems which enable vehicles to follow closely together in a safe, efficient, convenient manner.

Moreover, regardless of whether a vehicle, such as a tractor-trailer (e.g., a tractor hauling a trailer), is platooning or not, today's safety systems do not take advantage of the sensor technology developed over the past few decades. By in large, trailers connected to tractors do not communicate with those tractors using modern techniques, which would allow tractor-trailers to travel more safely. This is in large part due to the lifespan of trailers. Without too much corrosion, a trailer can last decades. That said, as long as there are trailers there will always be a need to replace them. As such, there is a need in the art to develop new trailers that implement various technologies to make them safer, more fuel efficient, more reliable, etc.

SUMMARY

The systems and methods comprising various aspects of the disclosure described herein cause vehicles to avoid adverse actions such as colliding with an object such as a curb. For example, without limitation, aspects of the present invention enable methods and systems for establishing a communication link between vehicles, determining dimensions of a first vehicle, determining the kinematics of the first vehicle, determining a pose of the first vehicle based information gathered by a sensor located on a second vehicle, determining a location of an object based on information gathered by a sensor located on a second vehicle, determining a path for the first vehicle to travel based on the dimensions of the first vehicle, pose of the first vehicle, kinematics of the first vehicle, and location of the object, and causing the first vehicle to avoid an adverse action by causing it to travel on the determined path.

It will be appreciated by those skilled in the art that the various features of the present disclosure can be practiced alone or in combination.

These and other features of the present disclosure will be described in more detail below in the detailed description of the disclosure and in conjunction with the following figures.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
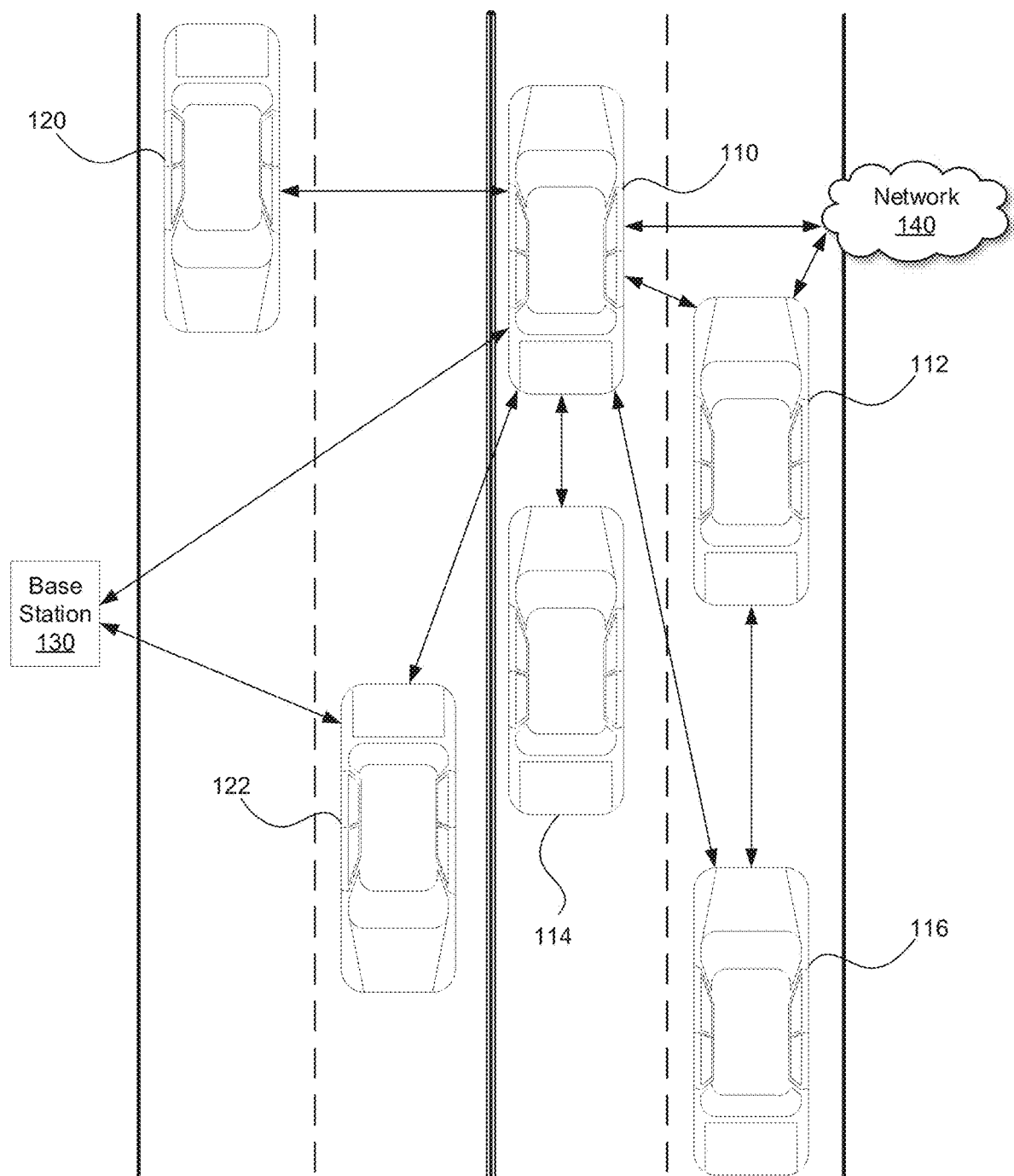
FIG. 1 illustrates a diagram of a platooning system, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practice without implementing all of the features disclosed herein. Further, although many embodiments included in the instant application are related to the concept of managing vehicle safety, including tractor-trailers, and platooning. It should be appreciated that many broader applications are envisioned.

Without limitation, the Applicant has proposed various vehicle platooning systems in which a second, and potentially additional, vehicle(s) is/are automatically, or semi-automatically controlled to closely follow a lead/front vehicle in a safe manner. By way of example, U.S. patent application Ser. Nos. 15/605,456, 15/607,902; 13/542,622 and 13/542,627; U.S. Provisional Patent Application Nos. 61/505,076, 62/377,970 and 62/343,819; and PCT Patent Application Nos. PCT/US2014/030770, PCT/US2016/049143, PCT/US2018/41684, and PCT/US2016/060167 describe various vehicle platooning systems in which a trailing vehicle (also referred to herein as a rear vehicle) is at least partially automatically controlled to closely follow a designated lead vehicle. Each of these earlier applications are incorporated herein by reference in their entirety for all purposes.

One of the goals of platooning is typically to maintain a desired gap between the platooning vehicles and/or a desired relative speed and/or time headway (e.g., a gap may refer to a distance, a headway, or both). Thus, it should be appreciated that, herein, any reference to the term "gap" could refer to a distance, a headway, or both. Further, while the term "maintain" is used throughout this disclosure, maintaining may mean staying within a gap (distance/headway), staying at or within a gap, and/or keeping at least a certain gap. Further, a desired gap may include a relative distance, time headway, and/or angle/offset. A longitudinal distance and/or time headway is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate. Again, it should be appreciated that herein, a gap may refer to a distance, a time headway, or both.

As described herein, the concept of platooning, also known as convoying, is still in its infancy. Academics have toyed with the concept over the last few decades, but to date there are no commercial systems on the road where a vehicle is at least partially controlled by another vehicle via a vehicle-to-vehicle connection (V2V). The benefits provided by such systems are obvious. Namely, the safety provided by these systems is far greater than a system where a rear vehicle doesn't begin to slow down until its radar or LIDAR sensors determine that a lead vehicle is slowing down, such as with some adaptive cruise control systems. Further, by being able to follow another vehicle at a close distance, in some cases both a rear vehicle and a front vehicle may experience significant fuel savings.

As platoonable vehicles (e.g., vehicles capable of platooning or any type of following based on V2V communication, whether directly following each other, offset in different lanes, and/or with one or more vehicles between them) begin to roll out of the labs and into commercial production, their adoption faces significant challenges. For example, the safety and reliability of tractor-trailers remains is a concern for at least semi-automated platoonable vehicles.

Platoonable vehicles may serve many purposes, including reducing drag on tractor-trailers. As discussed above, trailers are seldom replaced, but when they are, it is contemplated that new trailers may be "smarter" than the ones before. For example, in one or more embodiments described herein, a tractor-trailer may sense its own surroundings to prevent it from colliding with an object, such as a curb. As another example, in one or more embodiments described herein, a vehicle (which may or may not be a tractor-trailer) traveling behind a tractor-trailer can sense information about the trailer in front of it such as whether the trailer is traveling within its lane, or how close a trailer is from colliding with an object. Also, as applicable herein, it should be appreciated that a tractor-trailer may instead be any vehicle towing a trailer, boat, etc.

One or more systems described herein prevent at least a portion of a tractor-trailer (e.g., a trailer) from colliding with objects, prevent at least a portion of a tractor-trailer from veering out of its lane, and/or otherwise increase safety, reliability, fuel economy, etc. by gathering information about at least a portion of a tractor-trailer. That information may be gathered via sensors located on the tractor-trailer (e.g., the tractor connected to the trailer, or the trailer itself), a vehicle behind the trailer (which could be a second tractor and/or a second trailer), a base station, a cellular tower, etc.

By using sensors remote from a vehicle, an independent verification can be performed remote from a tractor-trailer to assist with preventing adverse actions. Adverse actions may include, but are not limited to: a tractor-trailer's trailer leaving its lane, or about to leave its lane; a tractor-trailer trailer colliding with an object, or about to collide with an object; a tractor-trailer's trailer that is moving/swaying more than a threshold amount; and a tractor-trailer jackknifing.

In some embodiments, a rear vehicle may determine that an adverse action is occurring/being performed. Forward facing sensors may be used to detect lane markings, curbs, and/or assist with determining a front tractor-trailer's pose and/or kinematics. A tractor-trailer's pose and/or kinematics may be projected into the future (e.g., an estimate may be made indicating the tractor-trailer is about to leave its lane or collide with an object), based on its current steering angle, an articulation angle, and/or other attributes. This way, systems described herein can prevent a trailer from running over a curb, for instance. In some embodiments, a vehicle's pose may be of greater, or lesser, importance based on its location (relative or otherwise). For example, processes described herein may place less weight (e.g., relative importance) on a tractor-trailer's pose if the tractor-trailer is further away from an obstacle it (e.g., one or more vehicle systems) is trying to avoid. Similarly, a vehicle's kinematics may be of greater, or lesser, importance based on its kinematics (e.g., an articulation angle/angular displacement, angular velocity, and/or angular acceleration of one or more portions of a tractor-trailer, such as its trailer). For example, a process described herein may place less weight (e.g., relative importance) on a vehicle's kinematics if the vehicle is further away from an obstacle it is trying to avoid. In some embodiments, a tractor-trailer's kinematics may be determined based on various attributes of the vehicle including, but not limited to: dimensions of a tractor, dimensions of a trailer, a location of a kingpin, a location of a fifth wheel, a location of an axle, a location of a dolly, and angular speeds of a tractor, trailer, and/or dolly. In some embodiments, the tractor-trailer's kinematics may be determined from observations made by the other vehicle. For example, the following vehicle might partially or entirely determine the position of the fifth wheel on the tractor, and/or the position of the rear axle of one or more trailers. It may also determine the length of the tractor and or trailer. It may also determine the position and geometry of the steering system of the tractor.

In one or more embodiments, the rear vehicle may be another tractor-trailer, the rear vehicle may be platooning with the front tractor-trailer, and/or the rear vehicle may determine that the front tractor-trailer's trailer is performing an adverse action based on information received at a sensor on the rear vehicle such as a camera, radar, or LIDAR.

Further, in some embodiments, as would be understood by a person skilled in the art, a sensor on a front vehicle (e.g., a front tractor or a front trailer) may be used to prevent a rear vehicle from performing an adverse action. As an example, a front vehicle may use an attached sensor to determine a location of an object and provide that location to a rear vehicle such that the rear vehicle may avoid that object. Systems herein may prevent vehicles from colliding with objects during maneuvers such as U-turns, or backing up. In some embodiments, a sensor may be on a building (e.g., a loading dock/bay), and/or a pole (such as one supporting a traffic light and/or a street light) to assist with preventing adverse actions.

In one or more embodiments, determining whether an adverse action is being performed may be performed by at least one or more of: establishing a communication link between a front tractor-trailer and a rear vehicle; determining one or more dimensions of the front tractor-trailer (dimensions may be determined by a transceiver in a trailer transmitting dimensions to an ECU in a tractor, scanning a code, capturing an image of at least part of a tractor-trailer on an electronic device, information entered by a user, etc.); determining a pose of the front tractor-trailer (which may be performed at least in part by a sensor on the front tractor-trailer and/or rear vehicle); determining vehicle kinematics of the front tractor-trailer (which may be performed at least in part by a sensor on the front tractor-trailer and/or rear vehicle); determining a location of a lane (e.g., via lane markers) and/or an object (which may be performed at least in part by a sensor on the front tractor-trailer and/or rear vehicle); determining a path for the front tractor-trailer; causing the front tractor-trailer to avoid departing the lane; and causing the front tractor-trailer to avoid colliding with the object.

In some embodiments, a path for the front tractor-trailer may be determined by one or more electronic control units (ECUs) on the front tractor-trailer and/or the rear vehicle (e.g., one or more platooning ECUs (PECUs), engine ECUs (EECUs), brake ECUs (BECUs), vehicle ECUs (VECUs) (which may comprise multiple ECUs), etc.). For example, an ECU may determine that a dissolve should be performed, as described in U.S. Patent Applications 62/638,794 and Ser. No. 15/926,809 (in other words, determining a path can include a dissolve, in some embodiments) (these U.S. Patent Applications are hereby incorporated in their entirety for all purposes). In some embodiments a path may be determined at least in part in a multi-tenant environment (e.g., at the front vehicle, the rear vehicle, and/or the cloud). In some embodiments, the location of a lane or object may be provided by a high-definition map (e.g., a map that includes locations of objects such as buildings, curbs, and/or trees, a map that includes road grades, etc.).

In some embodiments, the front tractor-trailer and the rear vehicle may be platooning while calculations are being performed that provide information to the front vehicle about a lane and/or an object. An object may include a curb, a box, a third vehicle, etc. As described herein, platooning may include a first vehicle controlling one or more brakes and/or torque of a second vehicle. For example, a front tractor-trailer may control the brakes of a rear vehicle.

In some embodiments, in response to determining a path for avoiding an adverse action: a rear vehicle may cause a front vehicle (e.g., a tractor-trailer) to avoid the adverse action; a rear vehicle may transmit information to the front vehicle and the front vehicle may use that information to determine a path to avoid the adverse action; and/or a notification may be provided to a driver of the front vehicle (e.g., via a graphical user interface, audio, a haptic device, etc.). In some embodiments, a system may continuously update the likelihood of an adverse action occurring. For instance, a system may cause an audio system to beep at certain speeds in response to a likelihood of an adverse action (similar to how backup sensors beep when they approach an object).

In some embodiments, determining a path for avoiding an adverse action may be based on attributes of a front and/or rear vehicle, which may include, but are not limited to a/an: tractor-trailer's trailer dimensions (e.g., width, length, height), tractor-trailer's tractor dimensions, gap (e.g., distance and/or headway) between a front and rear vehicle, pose, kinematics, speed, an articulation angle, yaw, yaw rate, turning radius, kingpin and/or fifth wheel location, number of trailers, wheelbase, coupler position, information entered by a driver into a system (e.g., via a knob, button, and/or GUI), features of a tractor-trailer designed to reduce drag and/or friction, steering angle, sensed objects (upcoming and/or passed), sensed lane markings, information provided by an inertial measurement unit, turning radius, latitude, longitude, altitude, heading, longitudinal and lateral acceleration, relative angle, type of load (e.g., type of materials a vehicle is carrying), brake status, brake pressure, path history, path projection, travel plans, destination, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, battery life, super charger, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, wheel angle, tire pressure, tire tread depth, cabin temperature, engine temperature, trailer interior temperature, camera, fleet of vehicles, network operations center (NOC), computer vision, and intervening traffic (e.g., cut-ins, also referred to as the situation when a vehicle enters an area between a lead vehicle and a rear vehicle).

In some embodiments, the attributes described above may be determined multiple times. For example, a wheel angle may by determined multiple times (e.g., it could be updated/a wheel angle rate may be determined), or an object may be sensed multiple times (e.g., a camera taking a video may be considered a sensor that is updated multiple times).

In various embodiments described herein, determining the likelihood of an adverse action may be based at least in part on information provided by a machine learning algorithm, artificial intelligence, a neural network, etc. For example, instances of tractor-trailers with certain attributes may be used to train an algorithm that causes a system to better project a future location of a tractor-trailer based on various attributes of the tractor-trailer.

In some embodiments described herein, whether a vehicle should be in front of another vehicle or in back of another vehicle when platooning may be determined by characteristics of a battery, either as static design characteristics or dynamic characteristics resulting from their use over their life—regardless of whether either of the vehicles are using sensors to prevent adverse actions.

For example, vehicles in a platoon may be ordered based on a battery cycle count of one of the batteries on one of the platooning vehicles. For example, a first vehicle with one or more batteries with lower battery cycle counts than a second vehicle may be preferred to platoon with the second vehicle it is the rear vehicle in the platoon.

Of course, battery cycle count, or other battery attributes (e.g., capacity, remaining charge) may be used to determine an order of platooning vehicles in addition to one or more of the vehicle attributes described above (e.g., with regard to determining a path to avoid an adverse action).

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

In various embodiments, vehicles 110, 112, 114, 116, 120, and 122 may be configured to platoon, and may platoon with one another. In some embodiments, vehicles may transmit and/or receive data (e.g., to a NOC and/or fleet management system, etc.) including, but not limited to data indicating: whether they are available to platoon; whether they are platooning; whether a platoon they were part of dissolved; what direction they are traveling; what direction they are predicted (e.g., predetermined/planning on/suggested) to be traveling on for a particular period of time; when they are expected to stop (e.g., predetermined to stop, planning on stopping, suggested stopping time); where they plan on stopping; what route(s) they plan to travel (e.g., a route suggested and/or determined by a system, a route determined by a navigation/mapping system based on their destination such a system may be a rendezvousing system, a fleet management system, a navigation system, etc.); what type of platooning system they are equipped with; how many hours they have been on the road; weather they are capable of following the leader (e.g., if one or more vehicles can platoon without a driver); whether they are capable of being the leader in a follow-the-leader system; whether the vehicle is fully autonomous (e.g., capable of level 4 according to the SAE classification system); how much fuel they have saved; how much money they have saved; an area they are allowed to travel within; an area they are not allowed to travel outside of; whether they are capable of platooning on city streets; whether they are only capable of platooning on a highway; whether they are capable of platooning on non-public roads; whether they are capable of platooning in a particular construction site, mine, forest, etc.; and whether other attributes associated with a vehicle's account allows them to platoon. As should be understood, one or more of these attributes may be used to determine whether a vehicle can platoon with one or more additional vehicles, and whether a vehicle should platoon with one or more additional vehicles. It is contemplated that in some embodiments, a system may rank one or more vehicles with which a vehicle should platoon. In such an embodiment, if a target vehicle (e.g., a vehicle with a high ranking) that a first vehicle attempts to platoon with platoons with second vehicle before the first vehicle is able to platoon with the target vehicle, then the first vehicle may select another (e.g., the next) ranked vehicle that the system would like it to (e.g., determines that it should attempt to) platoon with.

In addition to these factors, other information that a vehicle may transmit, receive, and/or base determinations described herein on vehicle attribute data including, but not limited to a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), whether a vehicle has an electric motor, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, and intervening traffic (e.g., cut-ins, also referred to as the situation when a vehicle enters an area between a lead vehicle and a rear vehicle). This information can be used by one or more vehicles, systems, fleets, etc. to determine whether a vehicle may platoon with another vehicle and/or to determine the best vehicle with which a vehicle may platoon. Again, it is contemplated that in some embodiments, a system may rank one or more vehicles with which a vehicle should platoon, and this ranking may be based on vehicle attributes described above. In such an embodiment, if a target vehicle that a first vehicle wishes to platoon with platoons with another vehicle before the first vehicle is able to platoon with the target vehicle, then the first vehicle may move to another (e.g., the next) ranked vehicle that the system would like it to (e.g., determines that it should attempt to) platoon with.

It should be understood that, herein, when a system determines a rendezvous location and/or rendezvous time, that any of these attributes/information/data may be used alone or in combination to determine: whether two or more vehicles can platoon together, a rendezvous location, a rendezvous time, etc.

Figure 2:
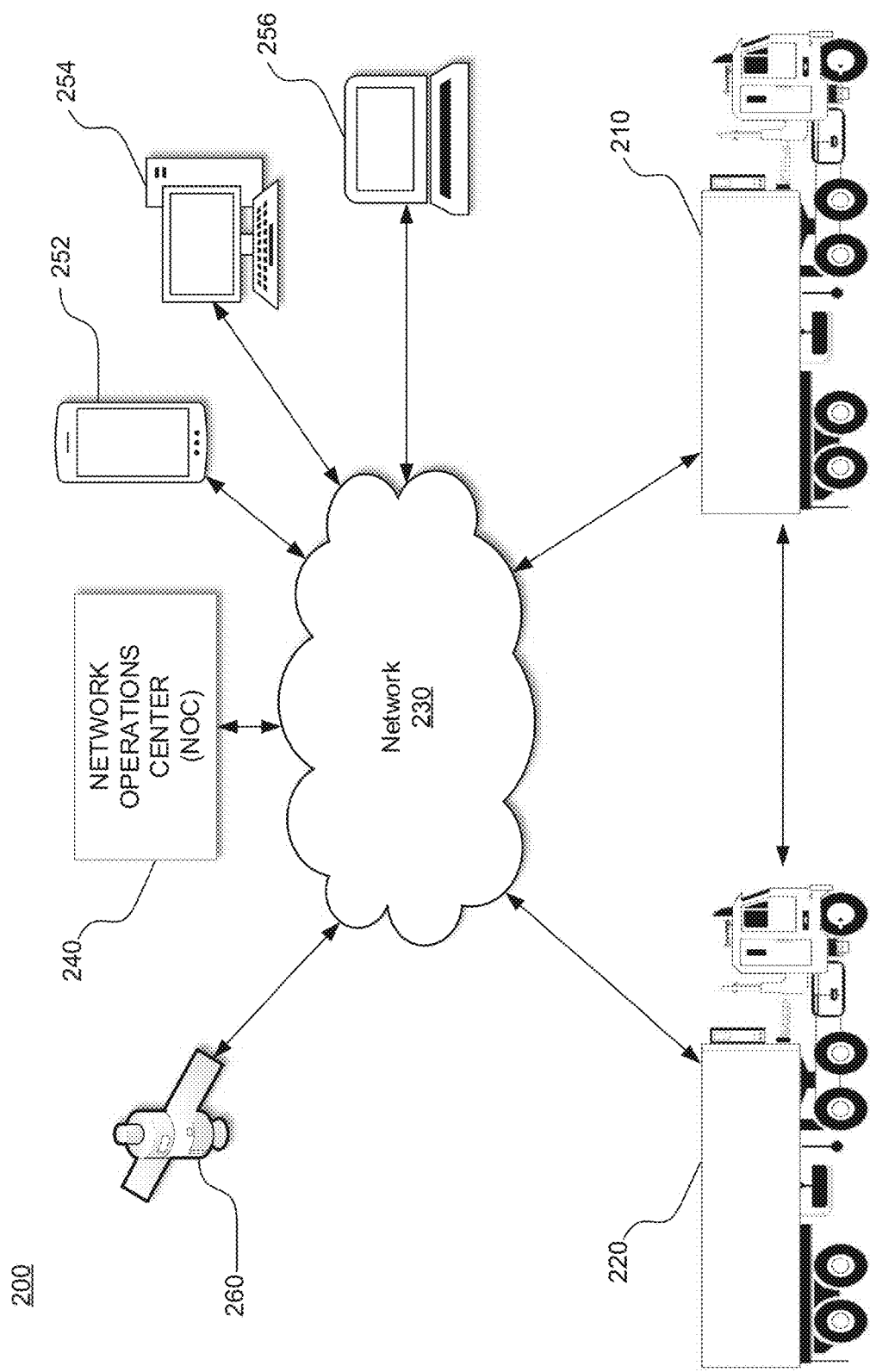
FIG. 2 illustrates a block diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., a NOC may be located in the cloud/a multi-tenant environment). NOC 240 can oversee a complex network of vehicles, satellite communications, cellular networks, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
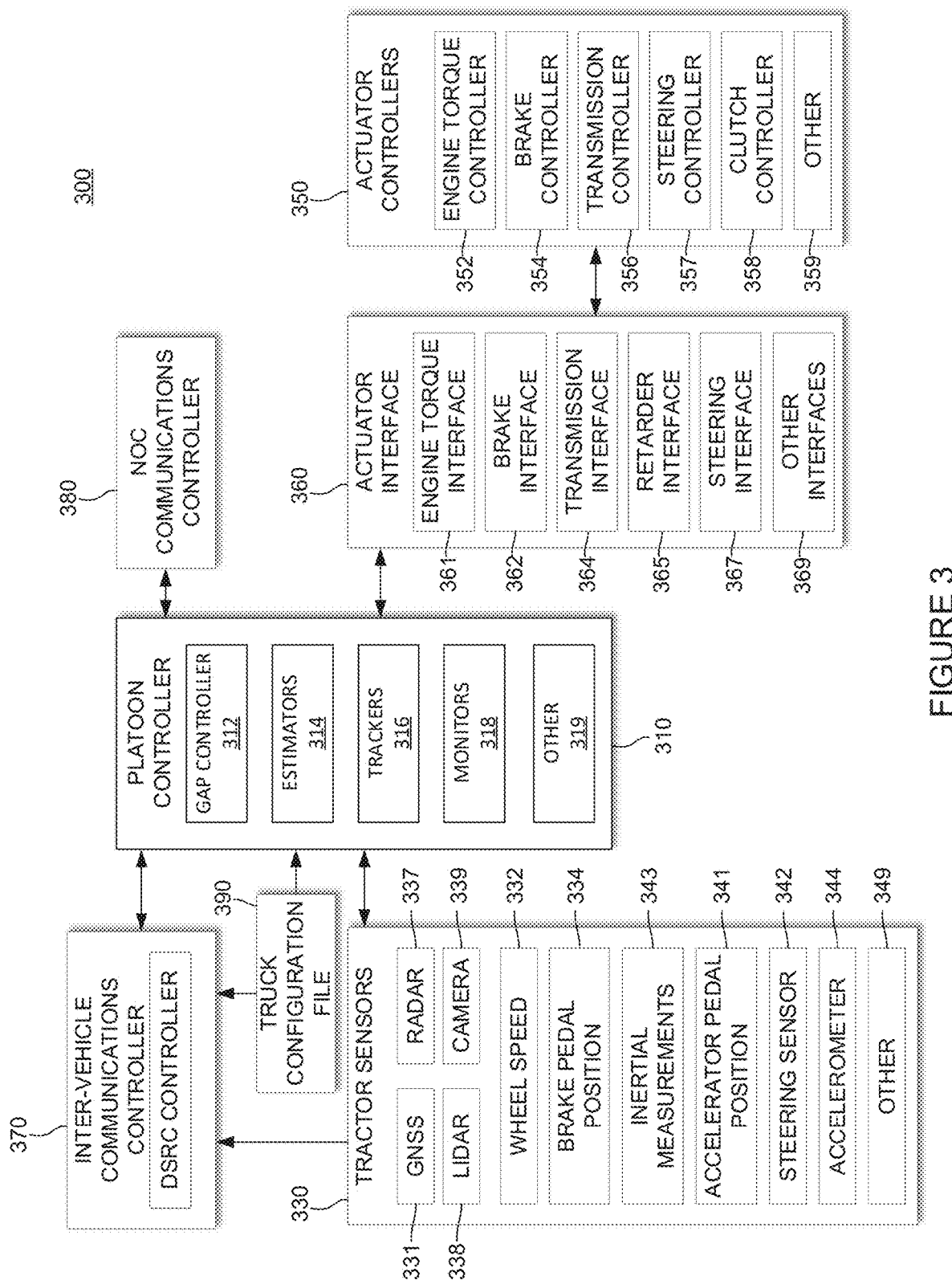
FIG. 3 illustrates a block diagram of a system including an electronic control unit, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning vehicles such as tractor-trailers. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, LIDAR unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and LIDAR unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chassis controller, or an engine ECU that also controls a retarder—which may obviate the need for a retarder ECU).

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have an engine brake (colloquially referred to as a "retarder") that can be used to augment the foundation brakes and/or serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, DSRC networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc. In some embodiments, configuration file 390 may include information about a driver, a fleet, a fleet's schedule, a driver rating, a driver's ability to use the system, whether a vehicle has permission to use a system, whether a vehicle is certified to use the system, etc.

Figure 4:
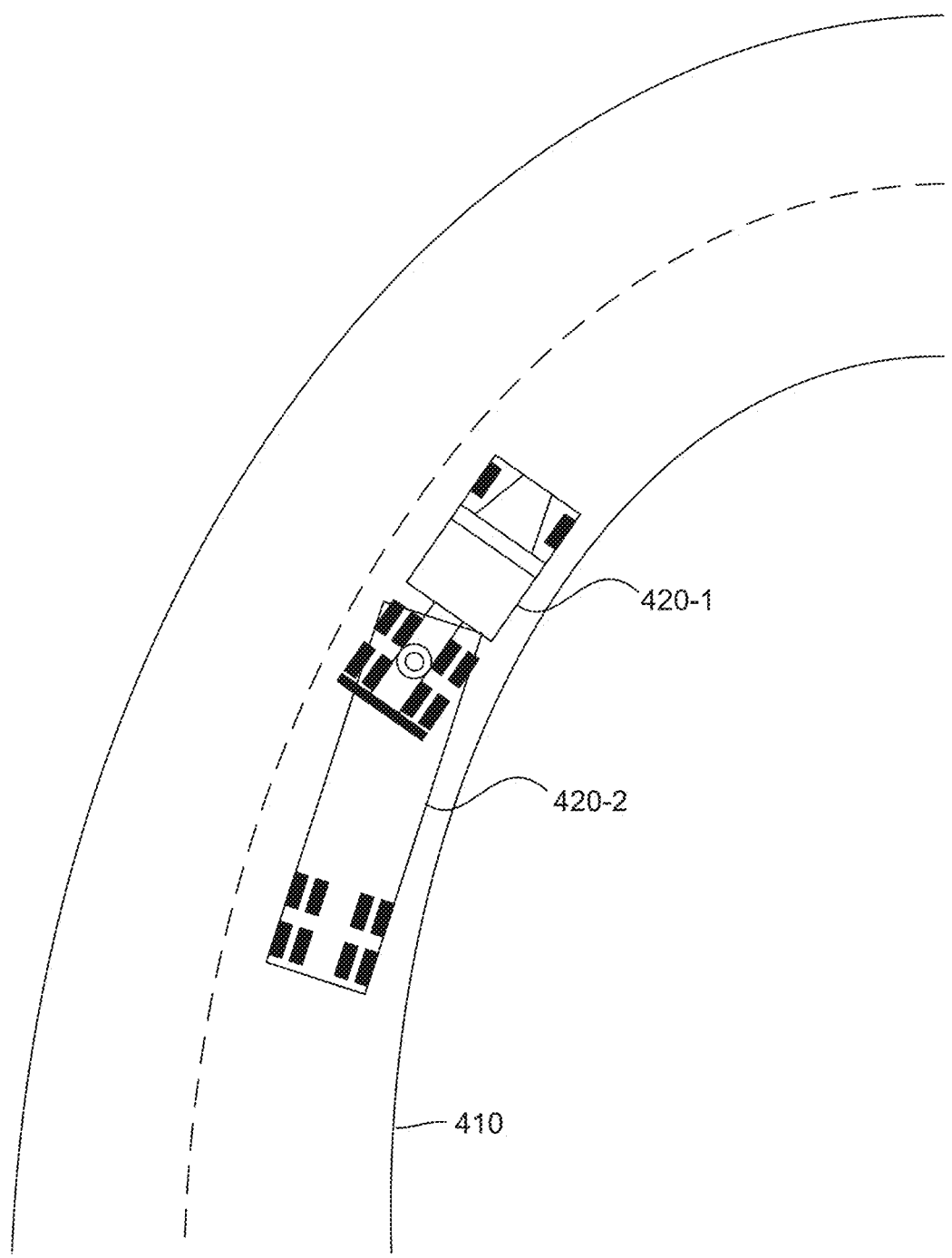
FIGS. 4-8 illustrate example vehicle systems, in accordance with some embodiments.

FIG. 4 illustrates an example vehicle system, in accordance with some embodiments. FIG. 4 includes a tractor-trailer 420 that comprises a tractor 420-1 and a trailer 420-2. In FIG. 4, tractor-trailer 420 is traveling on road 410. In various embodiments described herein, tractor-trailer 420 is at least semi-autonomous, and may receive signals over a wireless link (as shown in FIG. 1).

Figure 5:
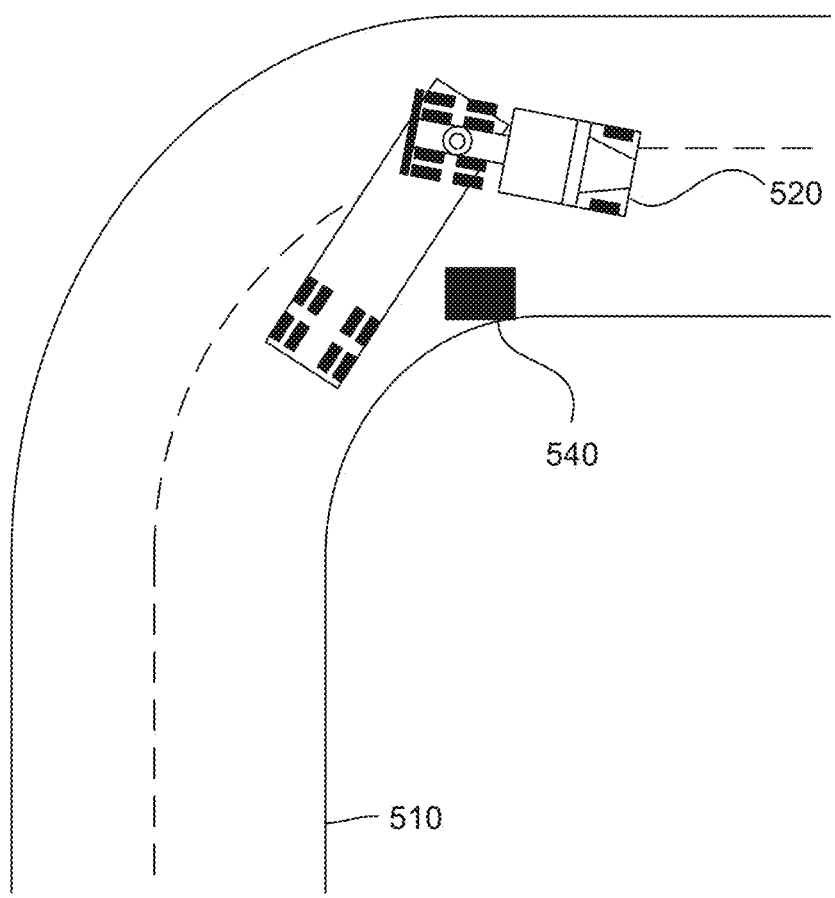

FIG. 5 illustrates an example vehicle system, in accordance with some embodiments. FIG. 5 includes tractor-trailer 520 traveling on road 510 and avoiding an adverse action, in this example, avoiding object 540. In some examples, object 540 is in the middle of a road, is a tree, a curb, the edge of a road, etc. In various embodiments, tractor-trailer 520 may receive information from a remote source, such as a multi-tenant environment (e.g., the cloud) that can assist tractor-trailer 520 with identifying object 540. Based on what type of object object 540 is, tractor-trailer 520 may drive over object 540 or drive around object 540. In some embodiments described herein, driving over object 540 may not be considered an adverse action, even though a vehicle comes into contact with object 540.

Figure 6:
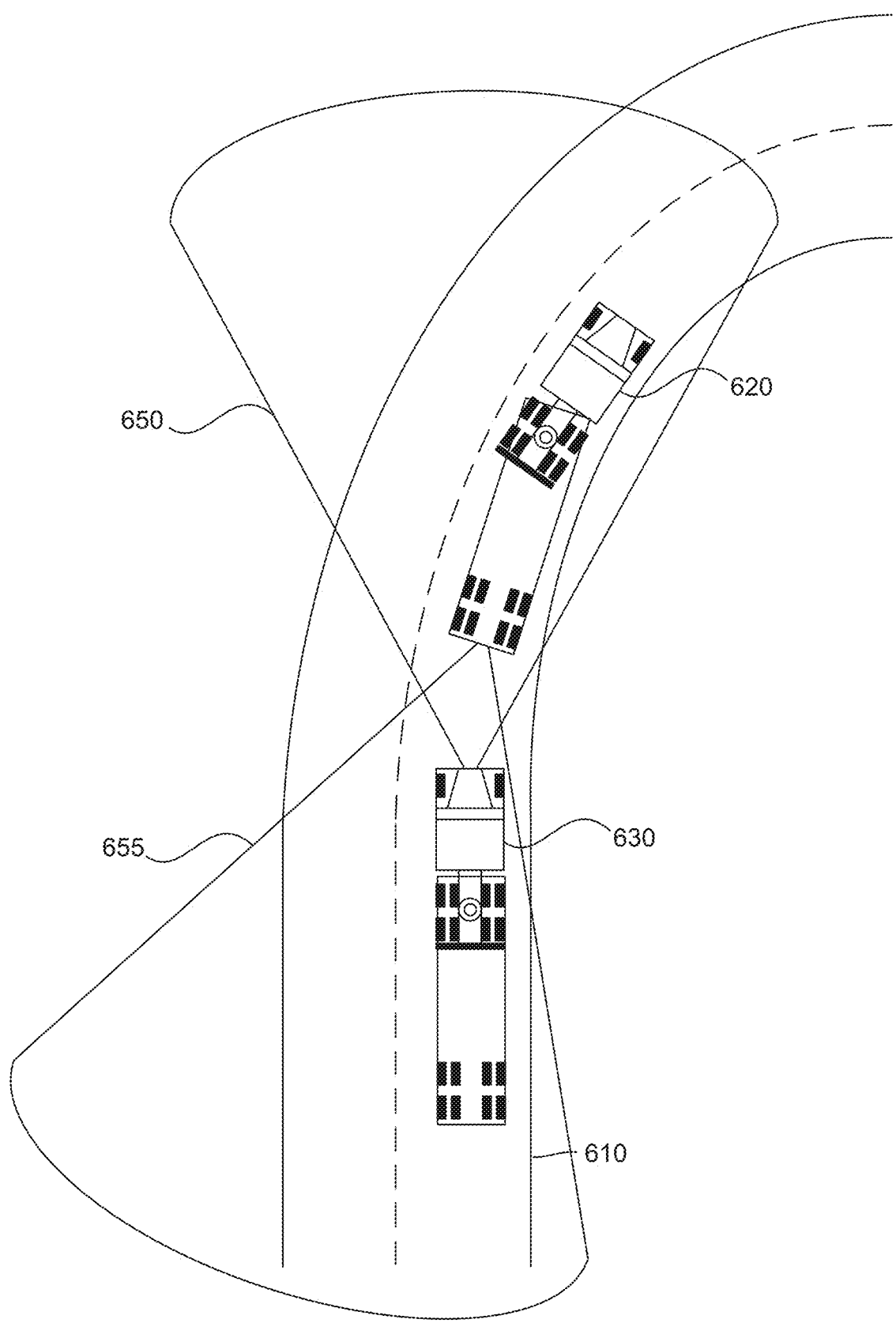

FIG. 6 illustrates an example vehicle system, in accordance with some embodiments. FIG. 6 includes tractor-trailers 620 and 630 traveling on road 610. In some embodiments, tractor-trailer 630 may include a camera or other sensor capable of gathering information within its field of view 650. Similarly, tractor-trailer 620 may include a camera or other sensor capable of gathering information within its field of view 655. In some embodiments, tractor-trailer 630 may wirelessly provide information gathered by one or more sensors located on tractor-trailer 630 to tractor-trailer 620 (or vice-versa). This information may include attributes of and/ or identities of objects within a threshold distance from a sensor (e.g., within fields of view 650 and/or 655, or a portion thereof). For example, a camera on tractor-trailer 630 may gather information about itself (e.g., its location or pose), and/or about tractor-trailer 620 in front of it (tractor-trailer 630) including the pose and/or kinematics of at least a portion of tractor-trailer 620. If a camera on tractor-trailer 630 determines that tractor-trailer 620 is performing an adverse action such as its trailer's wheels rolling over lane markers, tractor-trailer 630 may transmit that information (including a derivative thereof), to tractor-trailer 620 (e.g., so it may adjust its pose). In some embodiments, the information transmitted from tractor-trailer 630 to tractor-trailer 620 may cause tractor-trailer 620 to perform actions including, but not limited to: dissolving a platoon, pulling over to the side of road 610 (e.g., out of the way of traffic), cause an audible sound/alert/notification within the cabin of tractor-trailer 620, cause one or more tractor-trailers to engage in a fully autonomous mode (e.g., self-driving without the need for a driver or another vehicle controlling it), etc.

In one or more embodiments, tractor-trailer 630 may platoon with tractor-trailer 620. In some embodiments, tractor-trailer 630 may only transmit information about tractor-trailer 620 and/or an object to tractor-trailer 620 (or vice-versa) when tractor-trailer 630 is platooning with tractor-trailer 620. In some embodiments, tractor-trailer 630 may only transmit information about tractor-trailer 620 and/or an object to tractor-trailer 620 (or vice-versa) when tractor-trailer 630 is paired with tractor-trailer 620. Two vehicles may be paired when they communicatively coupled but not platooning, designated as being paired, etc. In some embodiments, two vehicles may be designated as being paired based on their attributes (e.g., as described above in reference to determining a path for avoiding an adverse action), and/or in response to the input at a remote terminal causing the two vehicles to be paired (e.g., one or more mouse clicks that cause two vehicles to pair, one or more mouse clicks that cause two vehicles to platoon).

Figure 7:
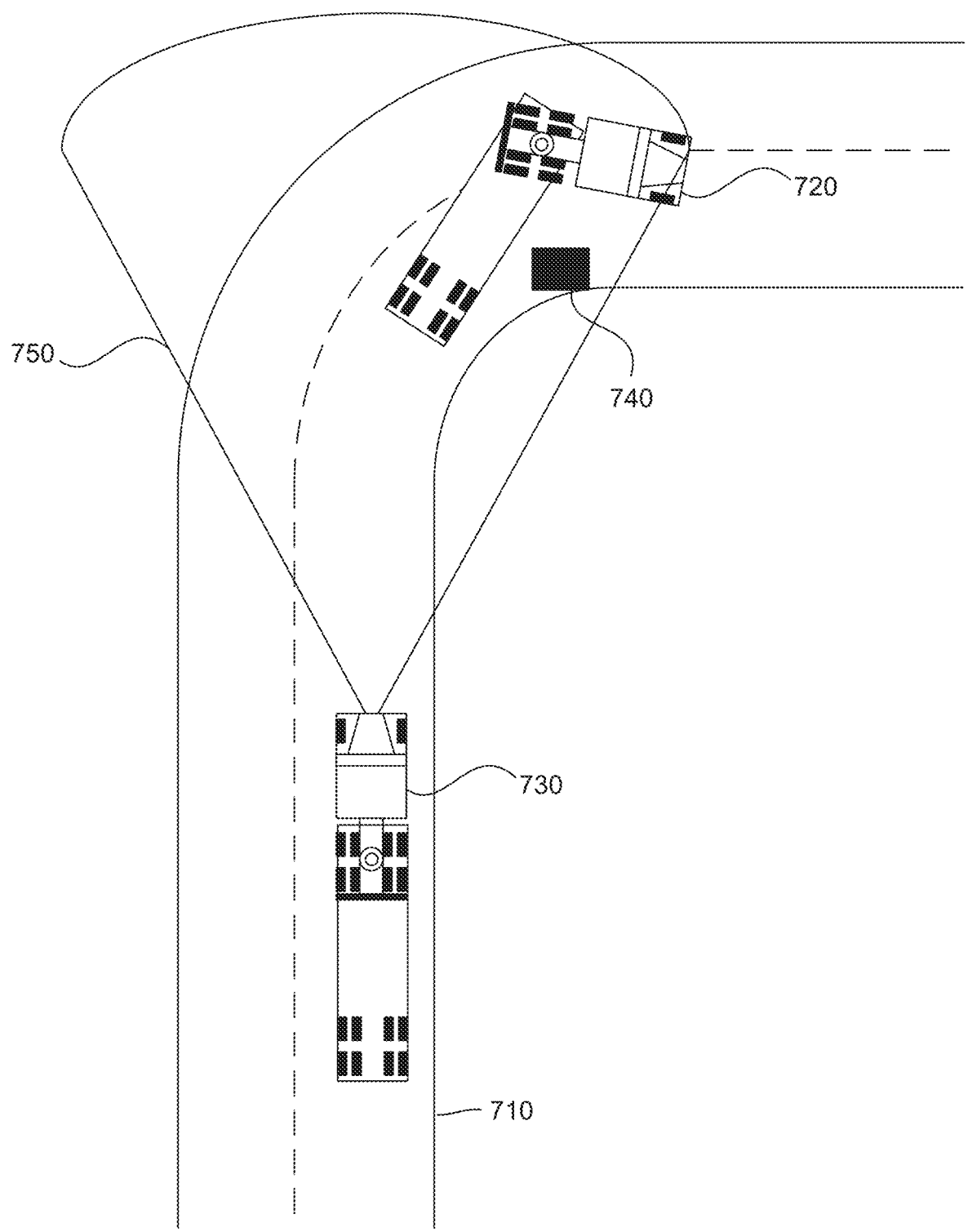

FIG. 7 illustrates an example vehicle system, in accordance with some embodiments. FIG. 7 includes tractor-trailers 720 and 730 traveling on road 710. As shown in FIG. 7, tractor-trailer 720 may be avoiding an adverse action such as coming into contact with object 740. In some embodiments, tractor-trailer 730 may include a camera or other sensor capable of gathering information within its field of view 750.

In some embodiments, different adverse actions may correspond with different weights (which may be referred to as penalties). For example, crossing over lane markers may have a lower weight than colliding with a tree. In such an example, tractor-trailer 720 may perform the adverse action with a lower weight. In other words, in this example tractor-trailer 720 may drive outside of its lane even though driving outside of its lane may be considered an adverse action because the weight (or penalty) associated with exiting its lane is less than the weight (or penalty) associated with colliding with object 740 (e.g., a weight (or penalty) may be part of a calculation/algorithm that determines actions to take).

In some embodiments, one vehicle may gather information from a sensor to determine whether another vehicle may exit its lane. For example, a sensor on tractor-trailer 730 may sense/identify object 740, and/or a vehicle traveling in a lane such that it may collide with tractor-trailer 720 were tractor-trailer 720 to exit its lane. In some embodiments, tractor-trailer 720 may travel out of its lane, stop, and/or dissolve a platoon in response to tractor-trailer 720 receiving information gathered by a sensor on tractor-trailer 730 (e.g., information indicating whether tractor-trailer 720 will collide with an object if it leaves its lane).

Figure 8:
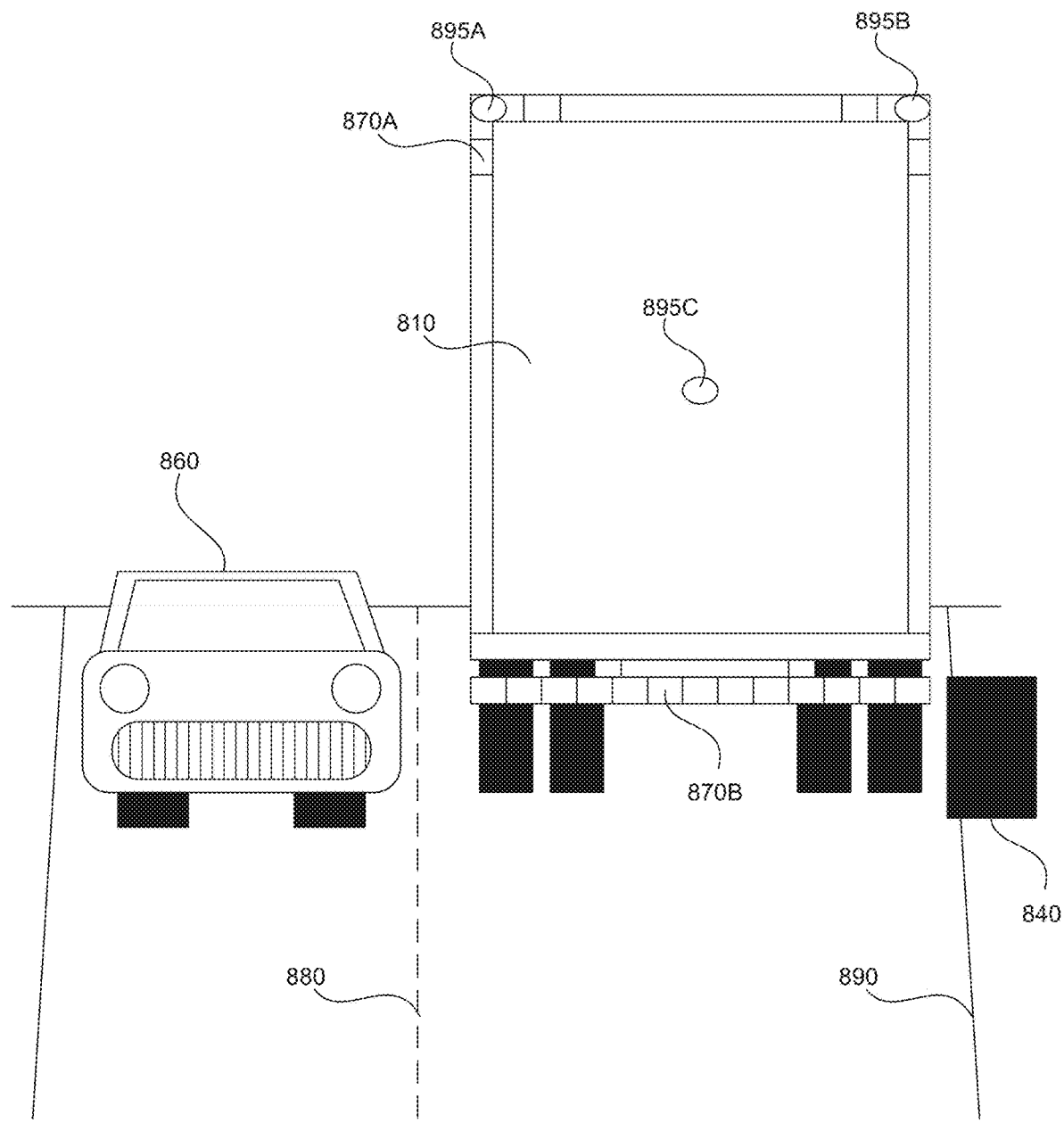

FIG. 8 illustrates an example vehicle system, in accordance with some embodiments. FIG. 8 includes a tractor-trailer 810, an object 840, a vehicle 860 traveling in an opposite direction of tractor-trailer 810, and lane markings (which can be used to determine a lane) 880 and 890. In some embodiments, tractor-trailer 810 may include fiducial markers 870A and 870B. Further, in some embodiments, tractor-trailer 810 may include sensors 895A-C.

In some embodiments, FIG. 8 is a view from a camera included in a rear vehicle that implements systems and methods described herein. For example, a rear vehicle may calculate the pose (e.g., location of and/or direction of travel) of the trailer portion of tractor-trailer 810, and/or the kinematics (e.g., an articulation angle/angular displacement, angular velocity, and/or angular acceleration of one or more portions of a tractor-trailer, such as its trailer). In response to the calculated pose and/or kinematics indicating an adverse action is about to occur or is occurring, a wireless signal may be sent from a rear vehicle to tractor-trailer 810. This wireless signal may cause a notification to be provided to a driver in a cabin of tractor-trailer 810, such as a sound or a message on a user interface (e.g., notifying a driver to pull over because their trailer is not staying within its lane).

When determining whether a trailer is with in its lane, a rear vehicle may compare the pose, kinematics, and/or location of a trailer with lane markings 880 and 890. In some embodiments, the compared information may be combined with information determined by tractor-trailer 810 itself to determine a path or other action to take.

In various embodiments, a rear vehicle or a front vehicle may determine that a lane marker indicates that a vehicle may pass another vehicle. If the rear vehicle or front vehicle determines such, it may share that information with at least the front vehicle, and/or a third vehicle 860. Information indicating a vehicle is going to pass another vehicle by changing lanes may be shared via wireless signals, and may include information gathered by one or more sensors located on the rear vehicle, one or more sensors located on the front vehicle (e.g., sensors 895A-C), one or more sensors located on a third vehicle 860, a multi-tenant environment, a NOC, and/or a base station. Further, in some embodiments, a rear vehicle and/or a third vehicle 860 may detect object 840, and transmit information indicating it sensed and/or identified object 840 to tractor-trailer 810. In some embodiments, a vehicle such as tractor-trailer 810 may independently sense and/or identify object 840, and receive information from a rear vehicle (which may be platooning with it), a third vehicle 860, a base station, a NOC, and/or a multi-tenant environment that verifies object 840 exists and/or is a particular thing (e.g., a person, a curb, or a tree).

In various embodiments, example fiducial markers 870A and/or 870B, or other computer vision techniques, may be used by a rear vehicle to determine a pose of tractor-trailer 810 or a portion thereof (e.g., its trailer). In some embodiments, it is contemplated that a rear vehicle may communicate with a front vehicle in response to detecting a sensor on a front vehicle. For example, a rear vehicle may detect a front vehicle in response to detecting a sensor on the front vehicle, or a rear vehicle may not platoon unless it detects one or more particular sensors on a front vehicle.

In one or more embodiments, as described throughout, a rear truck may detect and/or calculate information about a lead vehicle. In some embodiments, a front vehicle may also detect such information about itself, and/or a rear vehicle. Such information may include a front vehicle's position, heading, bearing, length, width, kinematics, fifth wheel position, axle position, kingpin position, yaw, etc. This information, and other information, may be received at a system on a rear vehicle via sensors located on the rear vehicle, and/or via sensors and/or wireless transmissions from a front vehicle. Of course, length and width may be dimensions of a vehicle. In some embodiments a length may refer to a length of a tractor-trailer in combination (which may include multiple trailers, in some embodiments), only a tractor, only a trailer, etc. In some embodiments, a width may refer to a width of a tractor, a width of a trailer, or the widest point at any portion of the tractor-trailer combination. Further, a rear vehicle may be able to determine information about an axle on a front vehicle (e.g., its location, which may be relative to a trailer), a fifth wheel position on a front vehicle, a number of trailers and/or dollies on a front vehicle, etc.

Based on such information, for example, a rear vehicle may determine, project, and/or estimate where at least a portion of a front tractor-trailer will be in 5 seconds based on one or more of the front tractor-trailer's: tractor dimensions, trailer dimensions, steering angle, fifth wheel location, trailer length, number of trailers (i.e., a number of trailers connected to a front tractor), number of dollies, kingpin position, two kingpin positions (e.g., if there is more than one trailer), an amount of tire slip and/or a slip angle, road conditions (e.g., moisture on a road), obstacles in its path, etc. Other factors that may assist a rear vehicle determine, project, and/or estimate where a front vehicle will be include a position (relative or otherwise) of a curb, wall, or other obstacle, including other vehicles (e.g., vehicles other than a front and rear vehicle (the two of which may be platooning)).

Of course, it should be understood that any of the determinations, projections, and/or estimations described herein may be made about a front vehicle, a rear vehicle, or another vehicle, and may be made at a front vehicle, rear vehicle, multi-tenant environment (such as the cloud), or a combination thereof.

In some embodiments, systems cause actions at a front and/or rear vehicle based on this information (e.g., the vehicle kinematics of a front and/or rear vehicle). Of course, more vehicles may calculate the information described herein, and a front vehicle may also be a rear vehicle, or vice-versa (e.g., a middle vehicle may be both a front vehicle and a rear vehicle, and in some embodiments a rear vehicle may cause a front vehicle to perform actions described herein). In some embodiments, one or more vehicles may sense information, calculate/determine/project/cause actions to occur in multiple vehicles (e.g., two, three, four, or more vehicles—whether part of a platoon or otherwise). Moreover, in addition to a front or rear vehicle being a tractor-trailer, in some embodiments a front and/or rear vehicle may be a straight truck (e.g., a box truck), a passenger vehicle, etc. In some embodiments, determinations, projections, estimations, and the transmission of information related thereto may occur at any vehicle and/or infrastructure such as a cellular tower or other base station.

Actions that may be taken based on information (e.g., vehicle kinematics) may include: information a driver of actions about to occur or about obstacles via audio and/or video; actuating steering, braking, transmission, and/or torque changes; changing weightings (e.g., scaling/gain) for variables in various determination, estimation, projection, speed control, and/or other algorithms, etc.

Figure 9:
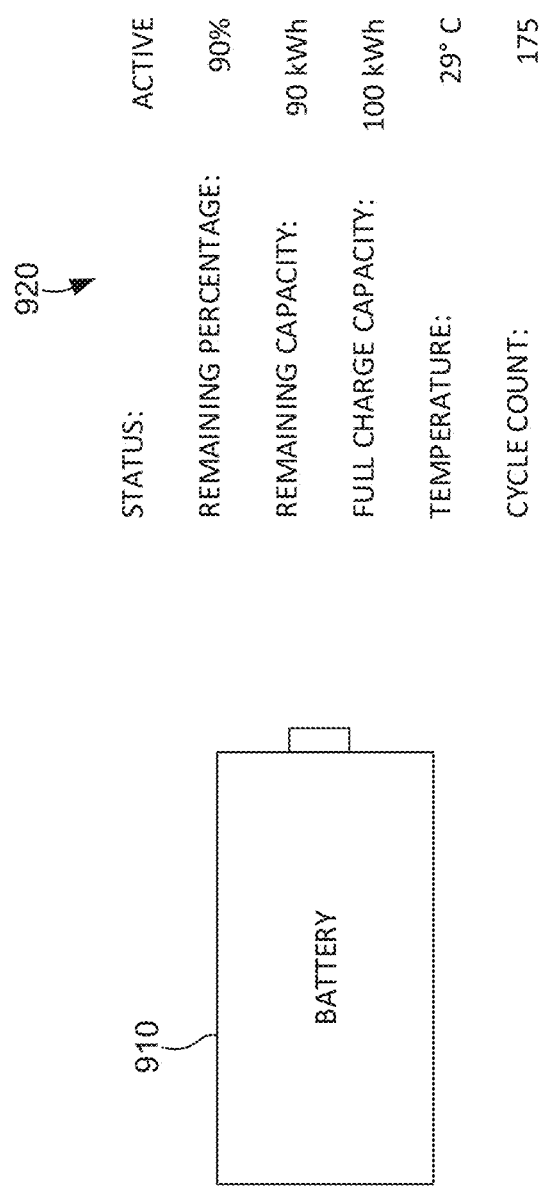
FIG. 9 illustrates attributes associated with a battery, in accordance with some embodiments.

FIG. 9 illustrates attributes 920 associated with a battery 910, in accordance with some embodiments. In various embodiments, battery 910 may be used to propel a vehicle such as the tractor-trailers described herein. In this example, attributes 920 indicate that a vehicle is active, a remaining amount of battery life is 90% of its capacity, its remaining capacity is 90 kWh, a full capacity is 100 kWh, a temperature is 29° C., and a battery cycle count is 175. In some examples, battery cycle count is an amount a battery has been used over its life. For instance, it may be a number of times the battery's capacity has been drained, and/or a total amount of charging or discharging over its life (e.g., 950 kWh discharged over the life of a 100 kWh battery could be represented as 9.5 cycles), and/or it may be a number of times a battery is charged by a certain amount (e.g., 100%, which may be two 50% charges).

Figure 10:
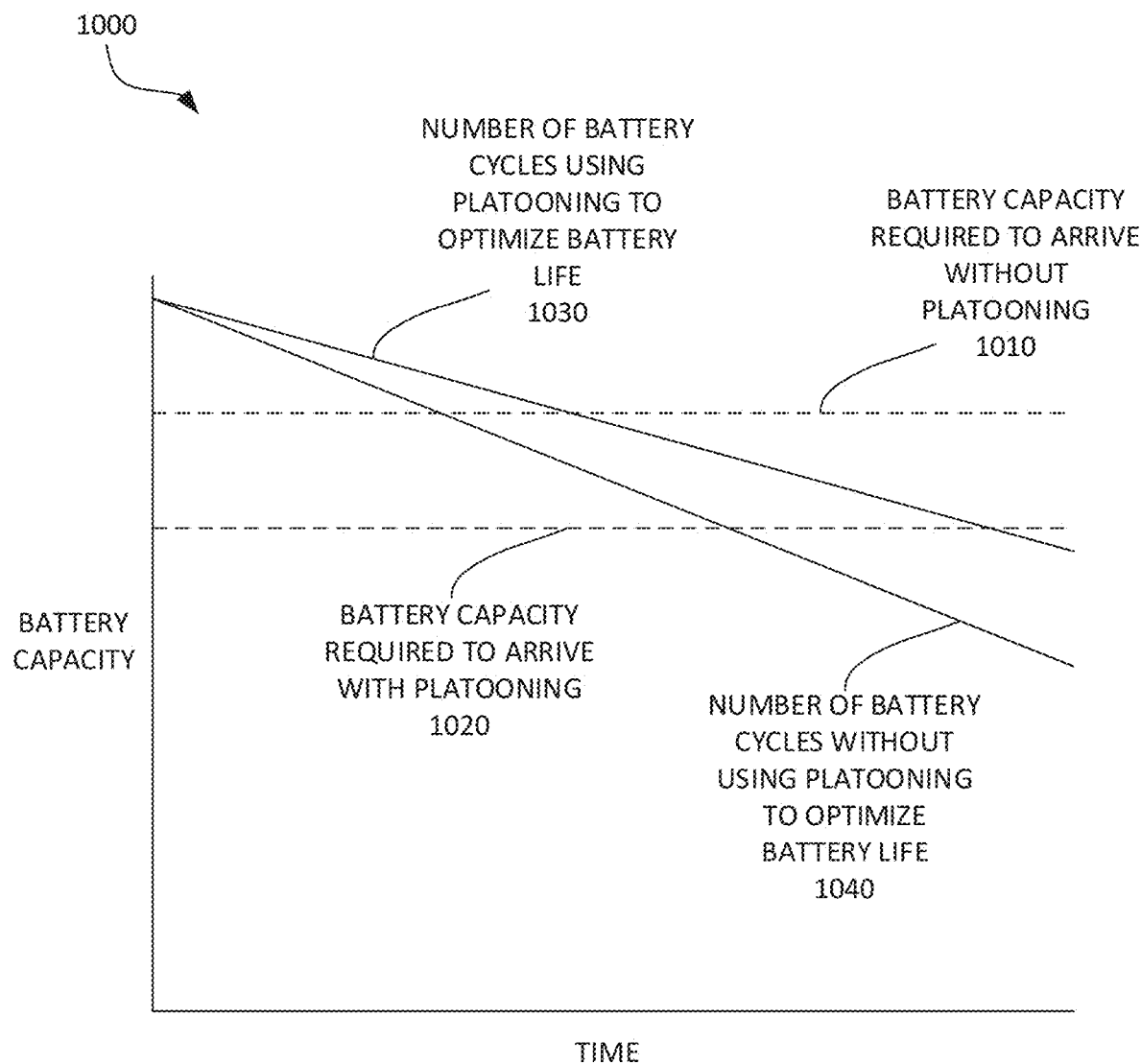
FIG. 10 illustrates a graph associated with at least one battery, in accordance with some embodiments.

FIG. 10 illustrates a graph 1000 associated with at least one battery, in accordance with some embodiments. Graph 1000 includes an x-axis representing time, and a y-axis representing a battery's capacity. Graph 1000 also includes a line indicating an amount of a vehicle's battery capacity required to arrive at a destination without platooning 1010, and a line indicating an amount of a vehicle's battery capacity required to arrive at a destination while platooning. In addition, graph 1000 includes a line representing a battery's capacity over time for a first battery 1030 with a first cycle count, and a line representing a battery's capacity over time for a second battery 1040 with a cycle count higher than the first battery 1030. As can be seen in graph 1000, a battery with a higher cycle count may drain battery capacity in less time than a battery with a lower cycle count. As such, in some embodiments, a platoon may be ordered such that a vehicle with a higher battery cycle count is behind a vehicle with a battery with a lower cycle count. In some embodiments, batteries may not be the same type, or one or more vehicles may have multiple batteries. Thus, in some embodiments, battery cycle counts may be abstracted and/or equalized by one or more ECUs/battery management systems such that the battery cycle counts may be compared using a common baseline.

Figure 11:
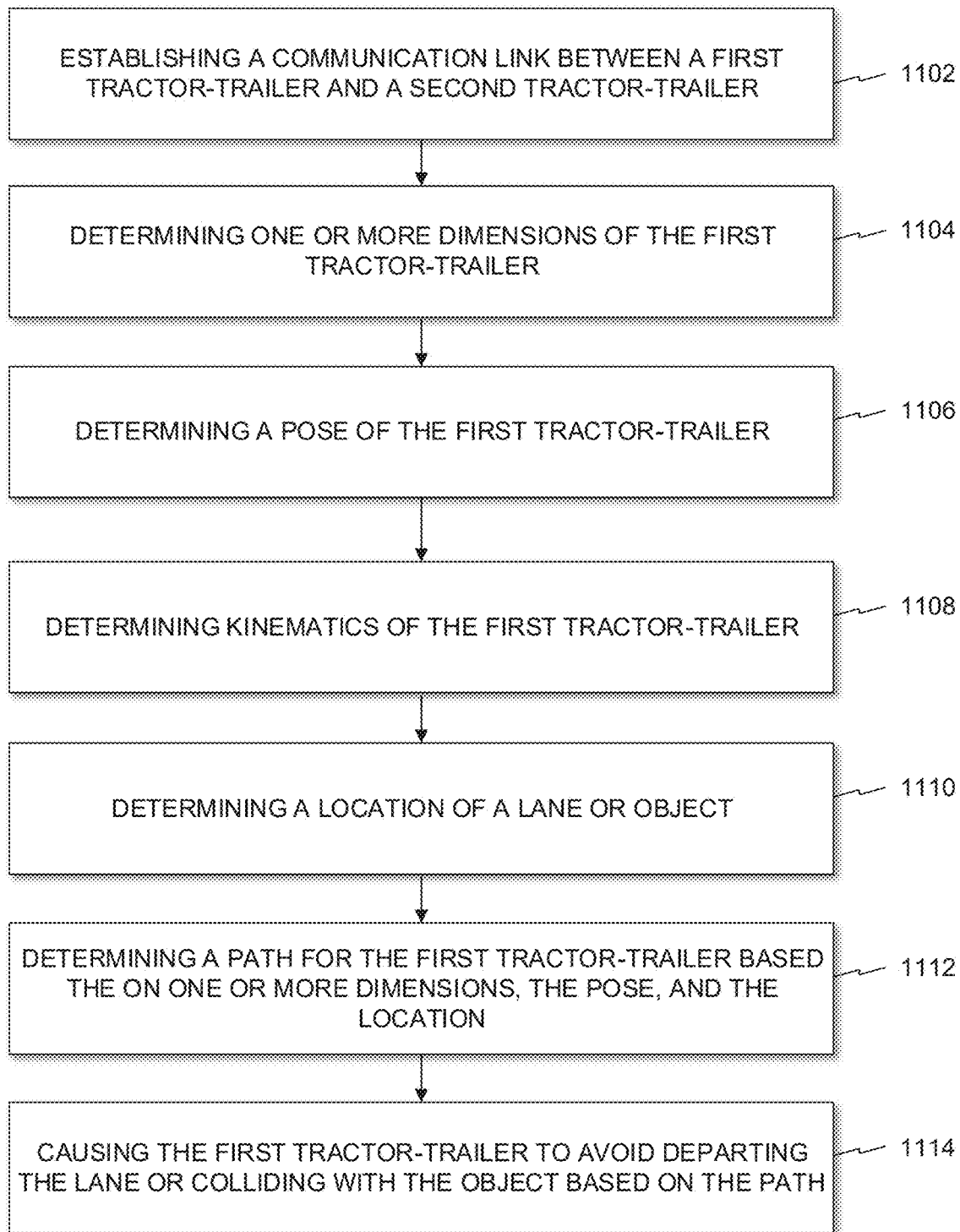
FIG. 11 illustrates a flow chart of an example process, in accordance with some embodiments.

FIG. 11 illustrates a flowchart of an example process, in accordance with some embodiments. Example process 1100 includes a method for causing a vehicle to avoid an adverse action, in accordance with various embodiments. While the various steps in the flowchart are presented and described sequentially, one of ordinary skill will appreciate that some or all of the steps can be executed in different orders and some or all of the steps can be executed in parallel. In one or more embodiments, if practicable, tractor-trailers described in this process may be other types of vehicles. Also, in some embodiments, not only does a rear vehicle determine and/or verify attributes of a front vehicle including whether the front vehicle is avoiding an adverse action, but a system is contemplated that performs similarly but wherein a front vehicle determines and/or verifies attributes of a rear vehicle including whether the rear vehicle is avoiding an adverse action. In some embodiments, both a front vehicle transmit data to a rear vehicle to at least in part cause the rear vehicle to avoid an adverse action and a rear vehicle may transmit data to a front vehicle to at least in part cause the rear vehicle to avoid an adverse action. Further, in one or more embodiments of the invention, one or more of the steps can be omitted, repeated, and/or performed in a different order. Accordingly, the specific arrangement of steps shown in FIG. 11 should not be construed as limiting the scope of the invention. In one or more embodiments, the steps of FIG. 11 can be performed by example systems 100, 200, 300, and/or computing system 1200.

In step 1102, in some embodiments, a communication link is established between a first tractor-trailer and a second tractor-trailer. Of course, in some embodiments, a tractor-trailer may be any type of vehicle. Using the communication link, the first tractor-trailer and the second tractor-trailer may platoon with one another. For example, the communication link may transmit information from the first tractor-trailer that causes the second tractor-trailer's brakes to activate, and/or allows the first tractor-trailer to command and/or control an amount of torque produced by an engine and/or motor in the second tractor-trailer.

In step 1104, in some embodiments, one or more dimensions of the first tractor-trailer are determined. For example, the one or more dimensions may be determined by a camera, radar, and/or LIDAR on the second tractor-trailer. In some examples, one or more dimensions of the first tractor-trailer may be determined based on information entered via a user interface in the first tractor-trailer by a driver, information entered via a user interface remote from the first tractor-trailer and a second tractor-trailer, a code that may be scanned, an image of the first tractor-trailer (e.g., taken by a camera), information provided by a multi-tenant environment (e.g., a NOC), information provided at a web application, information provided by a base station physically attached to a dock/bay, information provided by a base station connected to a facility capable of weighing a vehicle (colloquially known as a weigh station), etc.

The dimensions of the first tractor-trailer may include, but are not limited to: the shape of its tractor, the shape of its trailer, its wheelbase, the length of its trailer, the length of its tractor, its total length, the width of its trailer, the width of its tractor, its maximum width (e.g., MAX[tractor width, trailer width]), the height of its trailer, the height of its tractor, its maximum height (e.g., MAX[tractor height, trailer height]), and a distance between its fifth wheel and its cabin.

In step 1106, in some embodiments, a pose of the first tractor-trailer is determined. A pose may include a direction of travel and/or a location of the first tractor-trailer. In some embodiments, a pose may include a direction of travel and/or a location of the first tractor-trailer's tractor and/or trailer. A location may be independent of a second tractor-trailer, or it may be relative to a second tractor-trailer. For example, based on attributes of a second tractor-trailer such as wheel speed and direction of travel, the second tractor-trailer may determine a relative location of the first tractor-trailer. As described above, in various embodiments a first tractor-trailer and/or a second tractor-trailer need not be a tractor-trailer, but instead a vehicle such as a pick-up truck or passenger car.

In some embodiments, a pose of a trailer may be determined. A trailer's pose may be determined based on attributes including, but not limited to: a tractor's pose, a tractor's location (independent and/or relative to another vehicle such as a second tractor-trailer), a tractor's direction of travel, an articulation angle, a yaw angle, a yaw rate (e.g., of a trailer with respect to a tractor and/or coordinates), a trailer's dimensions (e.g., length, width, height), etc.

In some embodiments, a pose may be determined based on a combination of information gathered by sensors on both a first tractor-trailer and a second tractor-trailer, such as a camera, radar, LIDAR, wheel speed sensor, a GNSS, dimensions of at least a portion of the first tractor-trailer and second tractor-trailer, etc.

In various embodiments, a pose may be calculated by determining a location of the first tractor-trailer, a direction of travel of the first tractor-trailer, and/or one or more articulation angles of the first tractor-trailer. In one or more embodiments, one or more articulation angles may correspond to a yaw and/or yaw rate of a trailer.

In step 1108, in some embodiments, the kinematics of a vehicle may be determined. The kinematics of a vehicle may include an articulation angle/angular displacement, angular velocity, and/or angular acceleration of one or more portions of a tractor-trailer, such as its trailer. In some embodiments, a tractor-trailer's kinematics may be determined based on various attributes of the vehicle including, but not limited to: dimensions of a tractor, dimensions of a trailer, a location of a kingpin, a location of a fifth wheel, a location of an axle, a location of a dolly, and angular speeds of a tractor, trailer, and/or dolly. In some embodiments the tractor-trailer's kinematics may be determined from observations made by another vehicle. For example, a following/rear vehicle might partially or entirely determine the position of the fifth wheel on the tractor, and/or the position of the rear axle of one or more trailers. A following/rear vehicle may also determine the length of the tractor and or trailer. A following/rear may also determine the position and geometry of the steering system of the tractor.

In some embodiments, vehicle kinematics may be determined based on a combination of information gathered by sensors on both a first tractor-trailer and a second tractor-trailer, such as a camera, radar, LIDAR, wheel speed sensor, a GNSS, dimensions of at least a portion of the first tractor-trailer and second tractor-trailer, etc.

In step 1110, in some embodiments, the location of a lane or object is determined. For example, a second tractor-trailer (which may be the rear tractor-trailer in a platoon) may use one or more sensors to sense and/or identify a lane, lane markers, and/or an object. In some embodiments, at least some of a lane and/or object may be sensed and/or identified by a first tractor-trailer (which may be the front tractor-trailer in a platoon). An object may be a curb, another vehicle, etc. In various embodiments, the location of the lane or object sensed and/or identified by the second tractor-trailer may be independent of the second tractor-trailer and/or first tractor-trailer, or its location may be relative to the second tractor-trailer and/or first tractor-trailer.

In one or more embodiments, the location of a lane marker or object may be determined based at least in part on a pose and/or kinematics of a second tractor-trailer. For example, the direction that a second tractor-trailer (and/or its sensors) are facing may be used to determine a location of a lane marker or object independent of, or relative to, the first tractor-trailer. In some embodiments, it is contemplated that if a front tractor-trailer does not perform an adverse action while traveling through an envelope (e.g., the area covered by a tractor and its trailer while traveling) then the front tractor-trailer may transmit information (directly or indirectly) about the envelope it traveled through while avoiding an adverse action. In other words, a rear tractor-trailer may travel on a particular path based on the front vehicle traveling on that path. In some embodiments, to stay within an envelope created by a first tractor-trailer, a second tractor-trailer may use different commands, or amounts thereof, compared to the first tractor-trailer. For example, a system may cause a second tractor-trailer to travel at a different speed or adjust its wheel angles such that its tractor and trailer stay within the envelope created by the first tractor-trailer, even if the second tractor-trailer's tractor and/or trailer are a different size and/or weight than the first tractor-trailer.

In step 1112, in some embodiments, a path for the first tractor-trailer is determined based on its dimensions, pose, and a location of the lane or object. A path may be determined for the first tractor-trailer to travel based on the one or more dimensions of the first tractor-trailer, the pose of the first tractor-trailer, and/or the location of the lane or the object.

In one or more embodiments, a path may also, or alternatively, be determined based on attributes of a front and/or rear vehicle, which may include, but are not limited to a/an: tractor-trailer's trailer dimensions (e.g., width, length, height), tractor-trailer's tractor dimensions, gap (e.g., distance and/or headway) between a front and rear vehicle, pose, speed, articulation angle, yaw, yaw rate, turning radius, kingpin and/or fifth wheel location, location of a trailer's rear axle (e.g., which may be determined by at least the trailer including the rear axle), the kinematics and/or dimensions, number of trailers, wheelbase, coupler position, information entered by a driver into a system (e.g., via a knob, button, and/or GUI), features of a tractor-trailer designed to reduce drag and/or friction, steering angle, sensed objects (upcoming and/or passed), sensed lane markings, information provided by an inertial measurement unit, turning radius, latitude, longitude, altitude, heading, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, hybrid vehicle drivetrain (e.g., a parallel hybrid or an electric hybrid), electric motor, battery, battery life, super charger, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next determined stop, projected miles remaining until fuel tanks are empty, malfunctions, turn signals, LIDAR, radar, ultrasonic sensors, wheel angle, tire pressure, tire tread depth, cabin temperature, engine temperature, trailer interior temperature, camera, fleet of vehicles, network operations center (NOC), computer vision, and intervening traffic (e.g., cut-ins, also referred to as the situation when a vehicle enters an area between a lead vehicle and a rear vehicle).

In step 1114, in some embodiments, based on the path, the first tractor-trailer is caused (e.g., by one or more vehicle systems described herein) to avoid departing from the lane or colliding with the object. For example, one or more ECUs (e.g., a PECU, EECU, and/or BECU) may cause the first tractor-trailer to avoid an adverse action based on information received from the second tractor-trailer.

Figure 12:
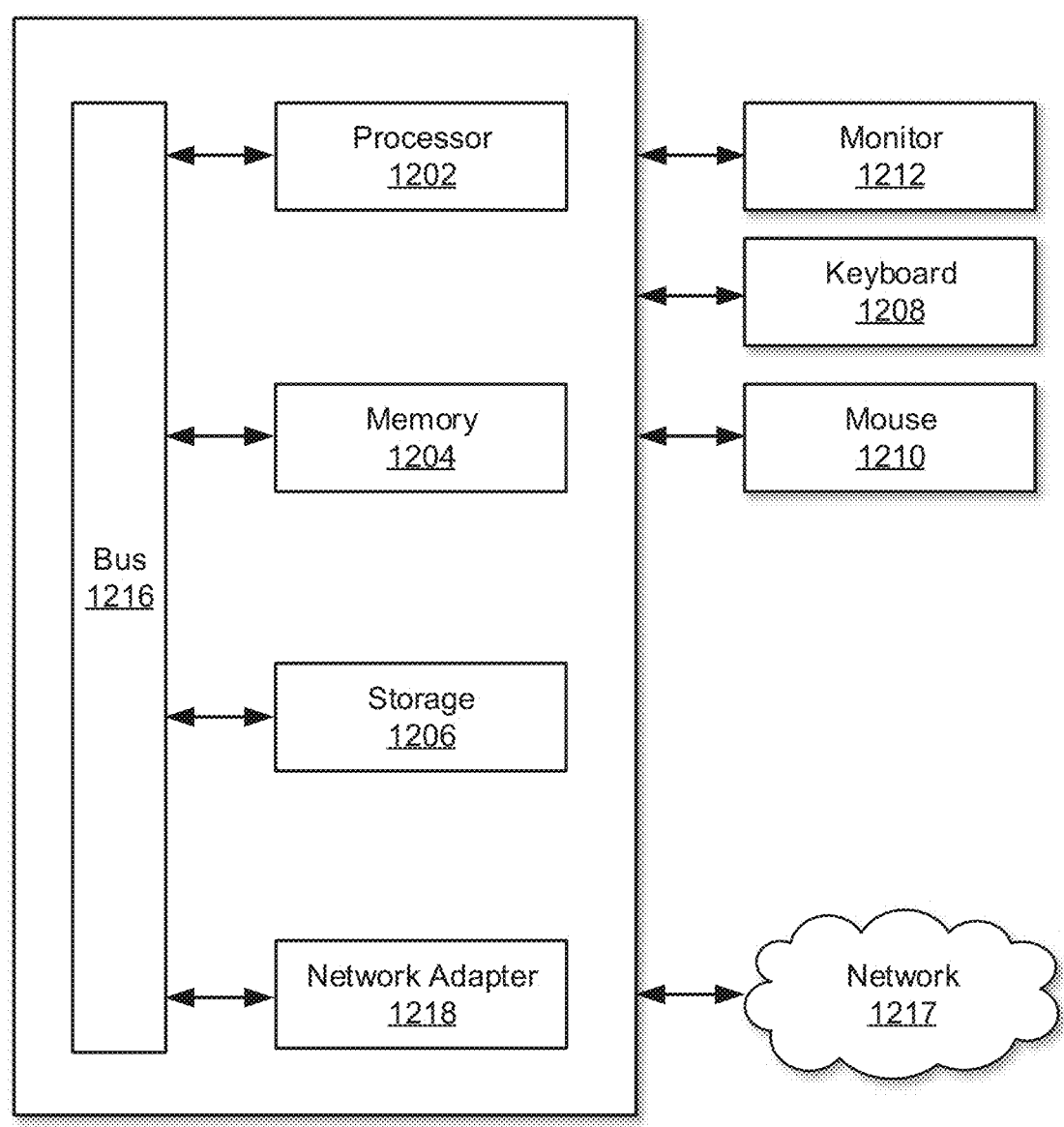
FIG. 12 illustrates an example computing system, in accordance with some embodiments.

FIG. 12 illustrates an example computing system 1200, in accordance with some embodiments.

In various embodiments, the calculations performed above may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC and to one or more processors. According to various aspects, each of these items may include various kinds of memory, including non-volatile memory, to store one or more programs containing instructions for performing various aspects disclosed herein.

For example, as shown in FIG. 12, example computing system 1200 may include one or more computer processor(s) 1202, associated memory 1204 (e.g., random access memory (RAM), cache memory, flash memory, read only memory (ROM), electrically erasable programmable ROM (EEPROM), or any other medium that can be used to store the desired information and that can be accessed to retrieve that information, etc.), one or more storage device(s) 1206 (e.g., a hard disk, a magnetic storage medium, an optical drive such as a compact disk (CD) drive or digital versatile disk (DVD) drive, a flash memory stick, etc.), and numerous other elements and functionalities. The computer processor(s) 1202 may be an integrated circuit for processing instructions. For example, the computer processor(s) may be one or more cores or micro-cores of a processor. The computing system 1200 may also include one or more input device(s) 1210, such as a touchscreen, keyboard, mouse, microphone, touchpad, electronic pen, or any other type of input device. Further, the computing system 1200 may include one or more output device(s) 1208, such as a screen (e.g., a liquid crystal display (LCD), a plasma display, touchscreen, cathode ray tube (CRT) monitor, projector, or other display device), a printer, external storage, or any other output device. The computing system 1200 may be connected to a network 1214 (e.g., a local area network (LAN), a wide area network (WAN) such as the Internet, mobile network, or any other type of network) via a network interface connection 1218. The input and output device(s) may be locally or remotely connected (e.g., via the network 1212) to the computer processor(s) 1202, memory 1304, and storage device(s) 1206.

One or more elements of the aforementioned computing system 1200 may be located at a remote location and connected to the other elements over a network 1214. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method for providing a path to at least a portion of a first tractor-trailer comprising:
    determining a pose of the first tractor-trailer, wherein the pose of the first tractor-trailer includes a location of the first tractor-trailer, a direction of travel of the first tractor-trailer, and one or more articulation angles of the trailer of the first tractor-trailer relative to at least a portion of the tractor of the first tractor-trailer, and wherein determining the pose of the first tractor-trailer comprises:
        determining the location of the first tractor-trailer;
        determining the direction of travel of the first tractor-trailer;
        determining the one or more articulation angles of the trailer of the first tractor-trailer relative to the at least a portion of the tractor of the first tractor-trailer; and
        calculating the pose of the first tractor-trailer based on the location of the first tractor-trailer, the direction of travel of the first tractor-trailer, and the one or more articulation angles of the first tractor-trailer;
    determining one or more dimensions of the first tractor-trailer, wherein the one or more dimensions of the first tractor-trailer include a length of the first tractor, a width of the first tractor, a length of the first trailer, and a width of the first trailer, wherein the first tractor is included in the first tractor-trailer, and wherein the first trailer is included in the first tractor-trailer;
    determining a location of a lane or an object; and
    providing the path to the at least a portion of the first tractor-trailer, wherein the path avoids the departing the lane or colliding with the object, and wherein the path is determined based at least in part on the one or more dimensions of the first tractor-trailer.

2. The method of claim 1, further comprising:
    determining a pose of a second tractor-trailer, wherein the pose of the second tractor-trailer includes a location of the second tractor-trailer, and a direction of travel of the second tractor-trailer, and wherein determining the pose of the second tractor-trailer comprises:
        determining the location of the second tractor-trailer;
        determining the direction of travel of the second tractor-trailer; and
        calculating the pose of the first tractor-trailer based on the location of the first tractor-trailer, the direction of travel of the first tractor-trailer, and the one or more articulation angles of the first tractor-trailer,
        wherein determining the location of the lane or the object is based on the pose of the second tractor-trailer and comprises detecting the lane or the object with a sensor included on the second tractor-trailer.

3. The method of claim 2, wherein the first tractor-trailer and the second tractor-trailer are platooning, and wherein providing the path to the at least a portion of the first tractor-trailer comprises providing the path to a platooning electronic control unity (PECU) included in the first tractor-trailer.

4. A method for providing a path to at least a portion of a rear tractor-trailer comprising:
  determining a pose of the rear tractor-trailer, wherein the pose of the rear tractor-trailer includes a location of the rear tractor-trailer, and a direction of travel of the rear tractor-trailer, and wherein determining the pose of the rear tractor-trailer comprises:
    determining, at a front tractor-trailer, the location of the rear tractor-trailer;
    determining, at the front tractor-trailer, the direction of travel of the rear tractor-trailer;
    calculating, at the front tractor-trailer, the pose of the rear tractor-trailer based on the location of the rear tractor-trailer, and the direction of travel of the rear tractor-trailer;
  determining one or more dimensions of the rear tractor-trailer, wherein the one or more dimensions of the rear tractor-trailer include a length of a rear tractor, a width of the rear tractor, a length of a rear trailer, and a width of the rear trailer, wherein the rear tractor is included in the rear tractor-trailer, and wherein the rear trailer is included in the rear tractor-trailer;
  determining a location of a lane or an object; and
  providing the path to the at least a portion of the rear tractor-trailer, wherein the path avoids departing the lane or colliding with the object, and wherein the path is determined based at least in part on the one or more dimensions of the rear tractor-trailer.

5. The method of claim 4, wherein determining the location of the lane or the object is performed by both the front tractor-trailer and the rear tractor-trailer.

* * * * *